United States Patent [19]
Rinderer

[11] Patent Number: 5,628,481
[45] Date of Patent: May 13, 1997

[54] SUPPORT SYSTEM FOR DATA TRANSMISSION LINES

[75] Inventor: Eric R. Rinderer, Highland, Ill.

[73] Assignee: B-Line Systems, Inc., Highland, Ill.

[21] Appl. No.: 460,468

[22] Filed: Jun. 2, 1995

Related U.S. Application Data

[62] Division of Ser. No. 175,591, Dec. 29, 1993.

[51] Int. Cl.$^6$ .................................................. E21F 17/02
[52] U.S. Cl. ........................... 248/58; 248/68.1; 403/170; 403/217
[58] Field of Search .............................. 248/68.1, 49, 58, 248/188.7, 300; 403/217, 218, 170

[56] References Cited

U.S. PATENT DOCUMENTS

| | | | |
|---|---|---|---|
| D. 190,608 | 6/1961 | Forrester | D80/8 |
| D. 228,737 | 10/1973 | Mathews | D8/8 |
| D. 261,960 | 11/1981 | Mathews | D6/114 |
| D. 308,628 | 6/1990 | Sorlien et al. | D8/356 |
| D. 317,112 | 5/1991 | Newuirth et al. | D8/356 |
| D. 326,404 | 5/1992 | Spell | D8/356 |
| 429,421 | 6/1890 | Coit . | |
| 1,130,379 | 3/1915 | Collis . | |
| 1,200,474 | 10/1916 | Dunlap . | |
| 1,206,203 | 11/1916 | Brockway . | |
| 1,344,514 | 6/1920 | Lessells . | |
| 1,356,040 | 10/1920 | Caskey . | |
| 1,764,629 | 6/1930 | Houts et al. . | |
| 1,764,630 | 6/1930 | Houts . | |
| 1,917,322 | 7/1933 | Peirce, Jr. . | |
| 2,026,312 | 12/1935 | Houts | 248/49 |
| 2,236,882 | 4/1941 | Vorkauf | 248/68 |
| 2,322,666 | 6/1943 | Schmitz | 248/68 |
| 2,656,998 | 10/1953 | Ullberg, Jr. | 248/68 |
| 2,874,923 | 2/1959 | Kaiser | 248/68 |
| 2,891,750 | 6/1959 | Bergquist | 248/58 |
| 2,899,159 | 8/1959 | LeBlang | 248/49 |
| 2,905,416 | 9/1959 | Wiegand | 248/58 |
| 2,917,259 | 12/1959 | Hill | 248/68 |
| 2,923,508 | 2/1960 | Daugherty | 248/58 |
| 2,939,664 | 6/1960 | Wesseler | 248/68 |
| 2,962,169 | 11/1960 | Landsman | 211/117 |

(List continued on next page.)

FOREIGN PATENT DOCUMENTS 249494  11/1991  Japan  ..................... 248/49

OTHER PUBLICATIONS

"A Revolutionary New System for Cable Trays", Ctlg. No. 166 Mono–Systems, Inc., Circa 1967, Jamaica, NY, pp.A1–17.
"Cable Trays", Ctlg. No. 289, Mono–Systems, Inc., undated, but admitted prior art, Jamaica, NY, pp. 2–19.
"Atlas Cable Tray", Atlas Cable Tray, Mar., 1992, Huntington NY, pp. 2–14.
"Cable Tray Systems", B–Line systems, Inc., 1990, Highland, IL, 160 pages.
"Takes Your Cable Everywhere . . . ", Mono–Systems, Inc, Jericho NY, undated, but admitted prior art, unnumbered pages.
"An Application Manual on . . . Mono Cable Tray", Mono–Systems, Inc., Jericho, NY, undated, but admitted prior art, pp. 2–23.
Atlas Cable Tray Accessories & Fitting Brochure, dated Jun., 1993.
Undated Atlas Cable Tray Pivot Connector Brochure.
Undated Atlas Cable Tray Flo–Thru Tee Brochure.
"Cable Support Systems", Instructions for Engineering and Erection, Catalog, pp. 8 and 10, Bettermann, 1992.
"Swiftrack, Swifts", pp. 6, 16 and 21, Catalog, 1988.
Modern Hanger Corp. catalog, 1953, p. 88.

*Primary Examiner*—Ramon O. Ramirez
*Attorney, Agent, or Firm*—Senniger, Powers, Leavitt & Roedel

[57] ABSTRACT

A support system for data transmission lines and the like, comprising a plurality of rail sections, a hub supported at a fixed elevation, and a plurality of rail connectors for connecting the rail sections to the hub in positions in which the rail sections radiate out from the hub.

18 Claims, 19 Drawing Sheets

U.S. PATENT DOCUMENTS

| | | | |
|---|---|---|---|
| 2,972,460 | 2/1961 | Kenyon | 248/62 |
| 3,022,030 | 2/1962 | Geer | 248/58 |
| 3,022,972 | 2/1962 | Bunston | 248/68 |
| 3,024,301 | 3/1962 | Walch | 174/72 |
| 3,034,753 | 5/1962 | Johnston et al. | 248/59 |
| 3,042,351 | 7/1962 | Du Bois | 248/49 |
| 3,076,865 | 2/1963 | Volk et al. | 174/146 |
| 3,112,093 | 11/1963 | Madl, Jr. | 248/68 |
| 3,137,468 | 6/1964 | Meinders | 248/49 |
| 3,156,765 | 11/1964 | Weiss | 174/101 |
| 3,363,048 | 1/1968 | Vaughn | 174/72 |
| 3,363,050 | 1/1968 | Martin | 174/101 |
| 3,429,535 | 2/1969 | Herzig | 248/58 |
| 3,443,782 | 5/1969 | Fields et al. | 248/188.7 |
| 3,521,843 | 7/1970 | Ogle | 248/58 |
| 3,563,882 | 2/1971 | Kimura et al. | 248/49 |
| 3,576,305 | 4/1971 | Welsh et al. | 248/68 |
| 3,598,349 | 8/1971 | Drake | 248/49 |
| 3,618,882 | 11/1971 | Podedworny | 248/68 R |
| 3,620,490 | 11/1971 | Roberts | 248/58 |
| 3,633,857 | 1/1972 | Logan | 248/62 |
| 3,680,817 | 8/1972 | Gogan | 248/68 |
| 3,713,613 | 1/1973 | Searls | 248/49 |
| 3,752,476 | 8/1973 | Mahoney | 248/188.7 X |
| 3,785,598 | 1/1974 | Gillstrap | 248/58 |
| 3,787,016 | 1/1974 | Laval, Jr. | 248/49 |
| 3,787,018 | 1/1974 | Nathan | 248/188.7 X |
| 3,791,613 | 2/1974 | Nollen | 248/49 |
| 3,851,378 | 12/1974 | Dessert | 29/523 |
| 3,870,260 | 3/1975 | Swart | 248/49 |
| 3,890,459 | 6/1975 | Caveney | 174/101 |
| 3,915,420 | 10/1975 | Norris | 248/58 |
| 3,923,277 | 12/1975 | Perrault et al. | 248/49 |
| 3,923,279 | 12/1975 | Gresley et al. | 248/318 |
| 3,936,024 | 2/1976 | Jung | 248/243 |
| 3,938,767 | 2/1976 | Norris | 248/58 |
| 3,948,473 | 4/1976 | Mason | 248/49 |
| 3,954,237 | 5/1976 | Harbarth et al. | 248/68 R |
| 3,960,350 | 6/1976 | Tardoskegyi | 248/54 R |
| 4,046,343 | 9/1977 | Kambara | 248/49 |
| 4,136,257 | 1/1979 | Taylor | 174/68 C |
| 4,214,723 | 7/1980 | Voorhees, Jr. | 248/68 R |
| 4,232,845 | 11/1980 | Turner | 248/49 |
| 4,244,152 | 1/1981 | Harper, Jr. | 403/217 X |
| 4,299,362 | 11/1981 | Buluschek et al. | 248/49 |
| 4,319,724 | 3/1982 | Bradbury | 248/49 |
| 4,330,221 | 5/1982 | Stumm | 403/218 |
| 4,347,998 | 9/1982 | Loree | 248/68 R |
| 4,366,939 | 1/1983 | McMillan | 248/68 R |
| 4,372,510 | 2/1983 | Skypala | 248/58 |
| 4,391,426 | 7/1983 | Göthberg | 248/49 |
| 4,429,797 | 2/1984 | Collins | 211/119 |
| 4,432,519 | 2/1984 | Wright | 248/49 |
| 4,442,989 | 4/1984 | Hartmann | 248/49 |
| 4,570,437 | 2/1986 | Moritz | 59/78.1 |
| 4,709,888 | 12/1987 | Cubit et al. | 248/73 |
| 4,765,576 | 8/1988 | Peled | 248/49 |
| 4,790,500 | 12/1988 | Mori | 248/49 |
| 4,802,643 | 2/1989 | Uys | 248/49 |
| 4,960,253 | 10/1990 | Perrault et al. | 248/68.1 |
| 5,004,192 | 4/1991 | Handler | 248/49 |
| 5,042,756 | 8/1991 | Pratt, Jr. | 248/49 |
| 5,062,605 | 11/1991 | Muhlethaler | 248/68.1 |
| 5,085,384 | 2/1992 | Kasubke | 248/62 |
| 5,092,546 | 3/1992 | Wolfbauer | 248/49 |
| 5,100,086 | 3/1992 | Rinderer | 248/49 |
| 5,123,618 | 6/1992 | Guterman et al. | 248/49 |
| 5,127,759 | 7/1992 | Orbom | 403/218 |
| 5,169,099 | 12/1992 | Yang | 248/49 |
| 5,320,312 | 6/1994 | Hoenninger | 248/68.1 |
| 5,320,439 | 6/1994 | Perrault et al. | 403/379 |

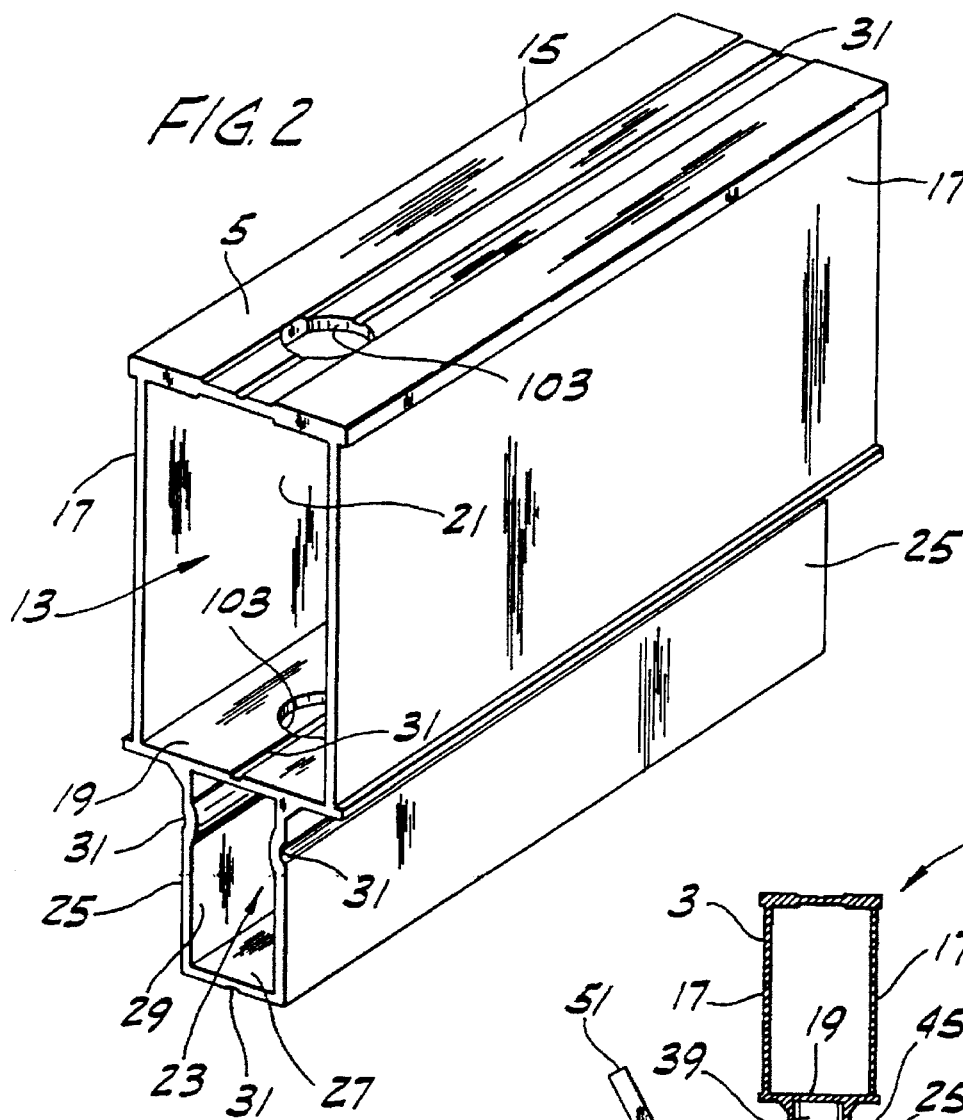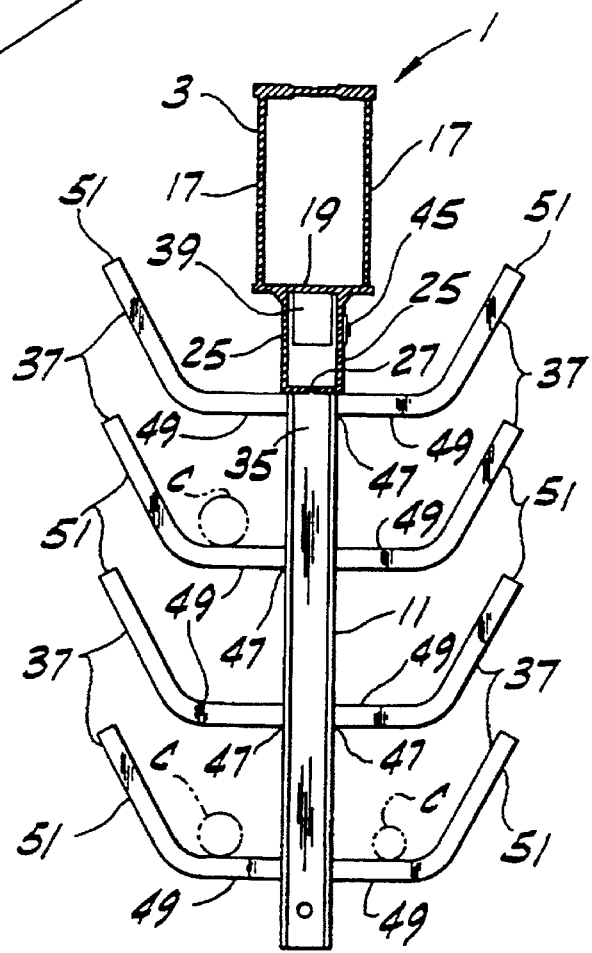

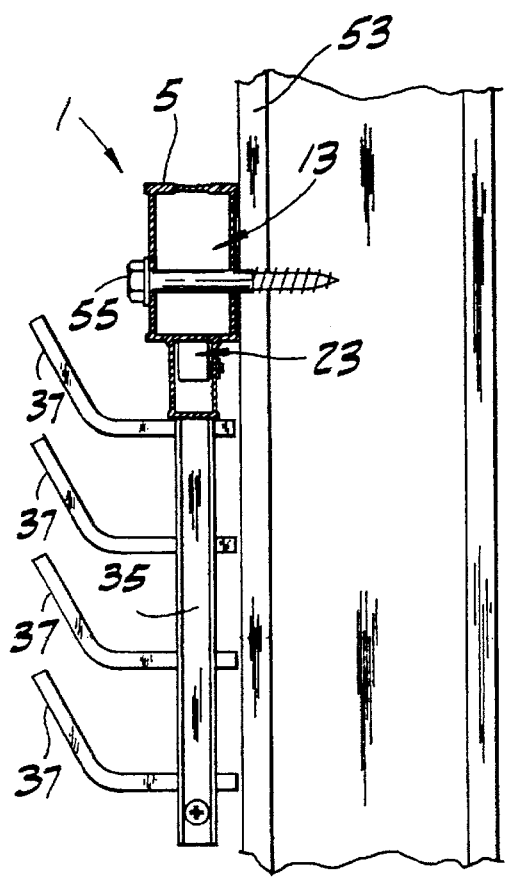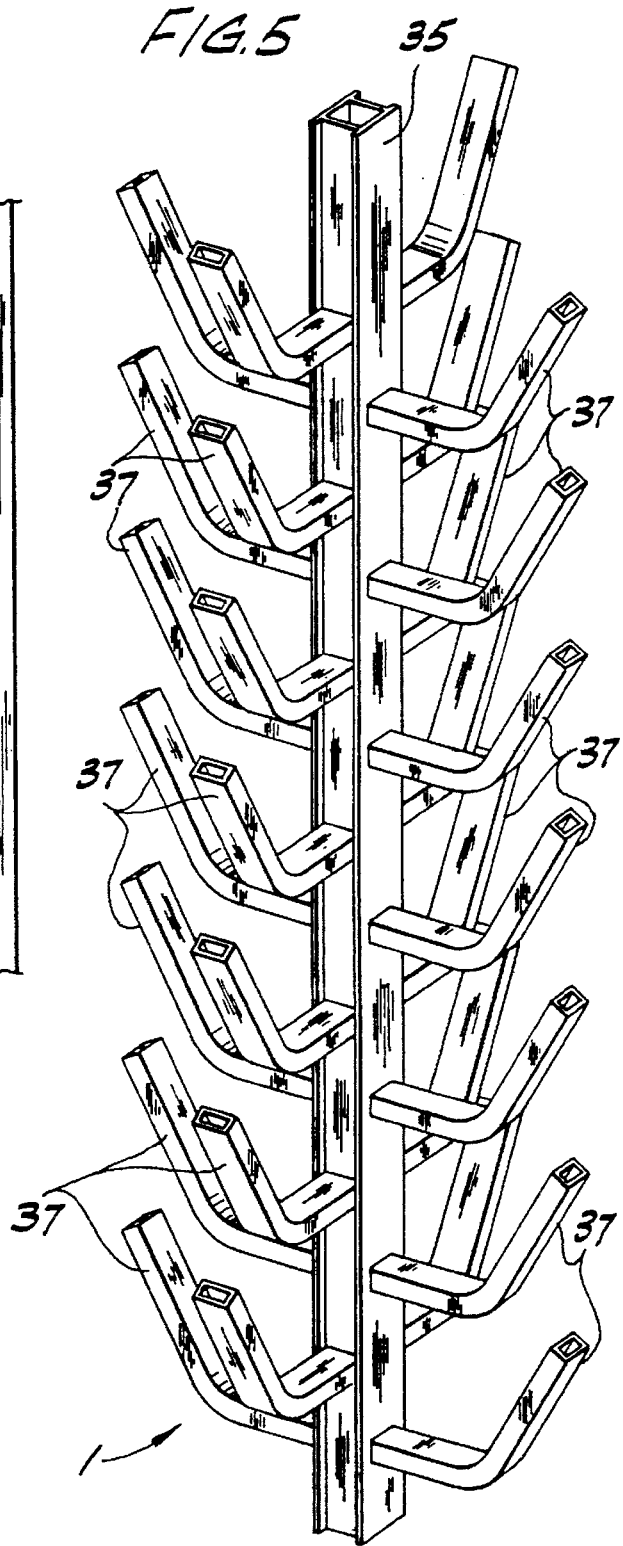

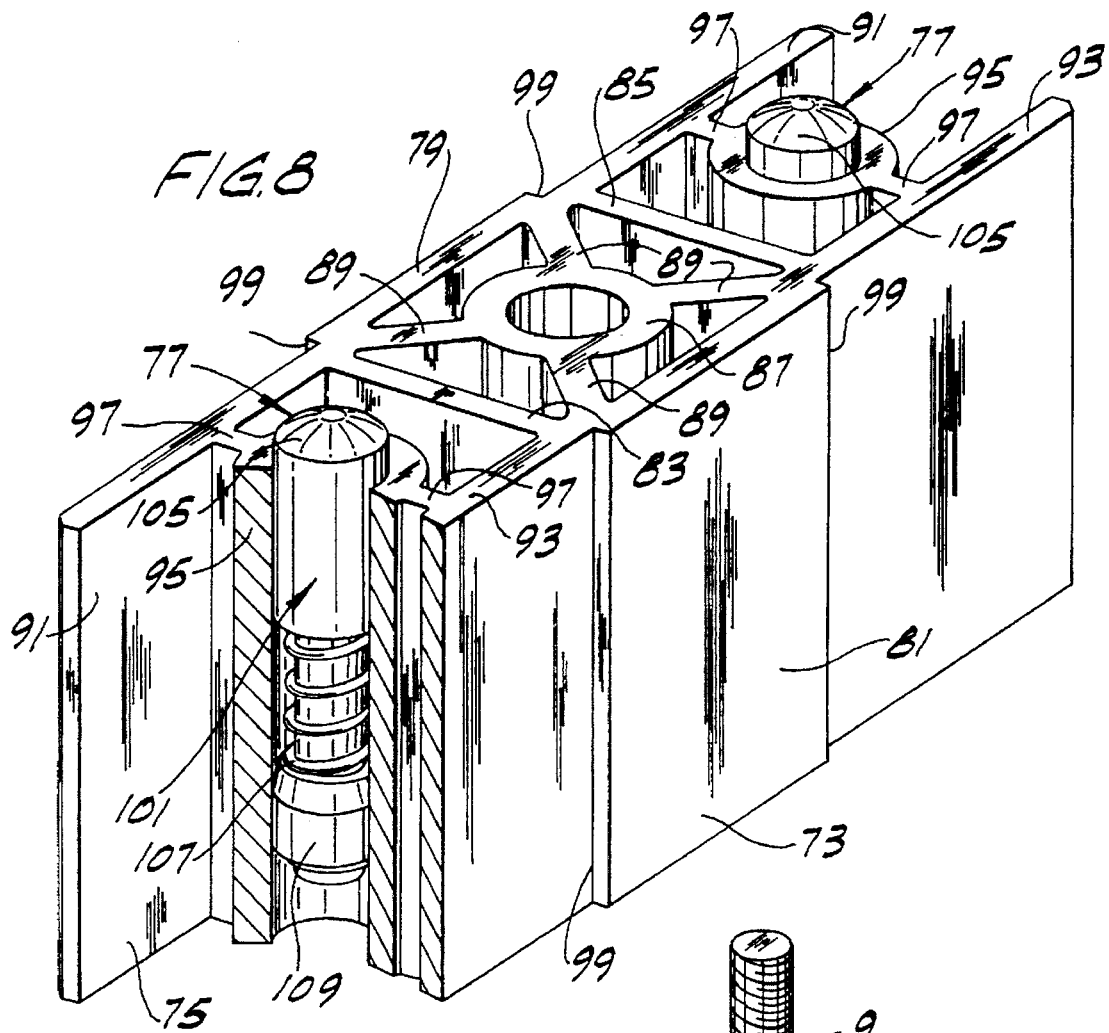
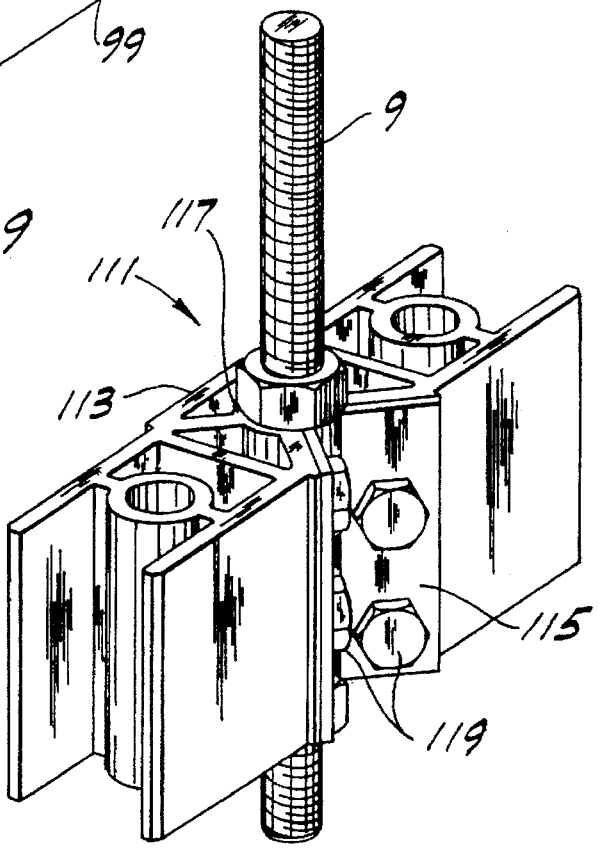

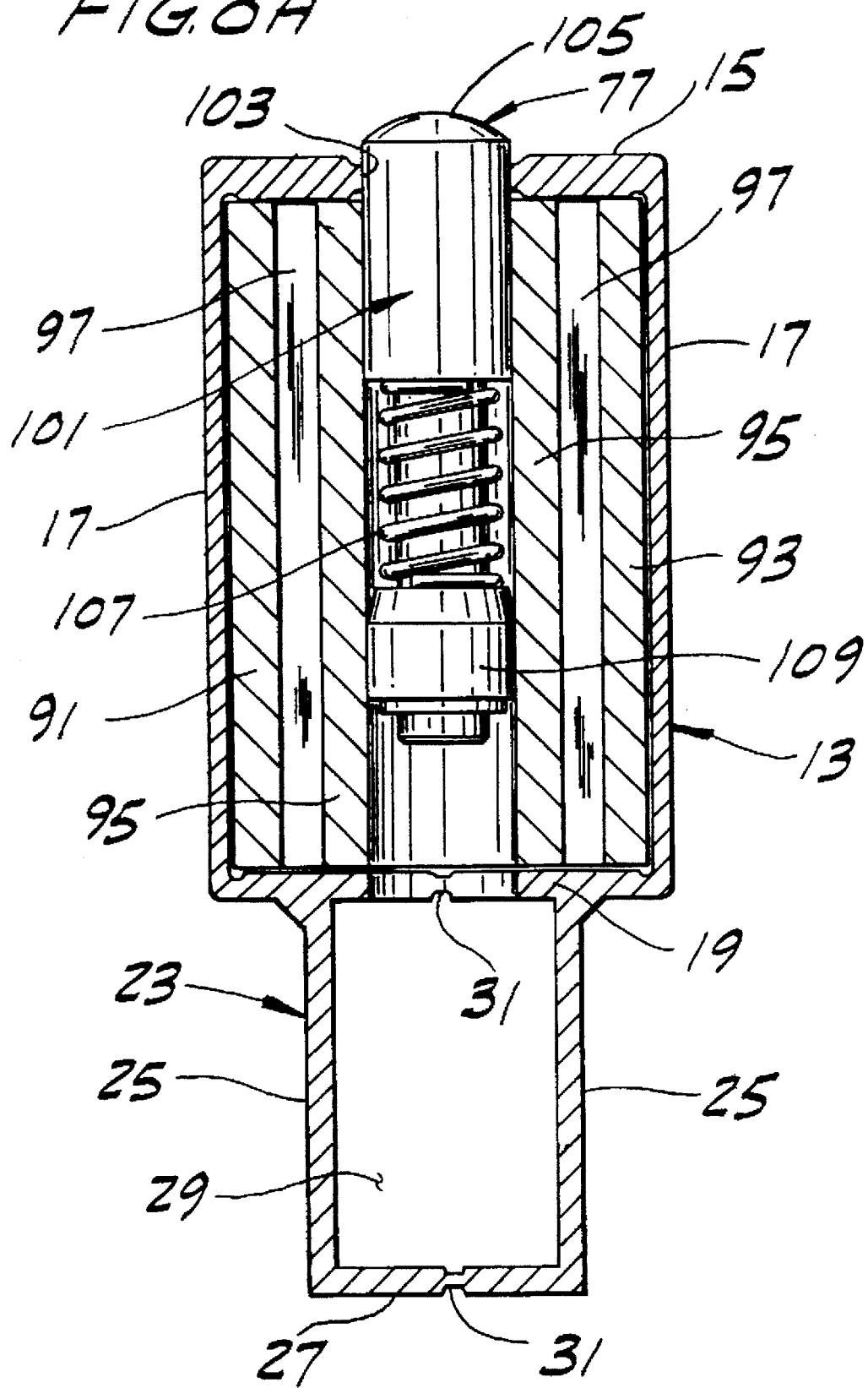

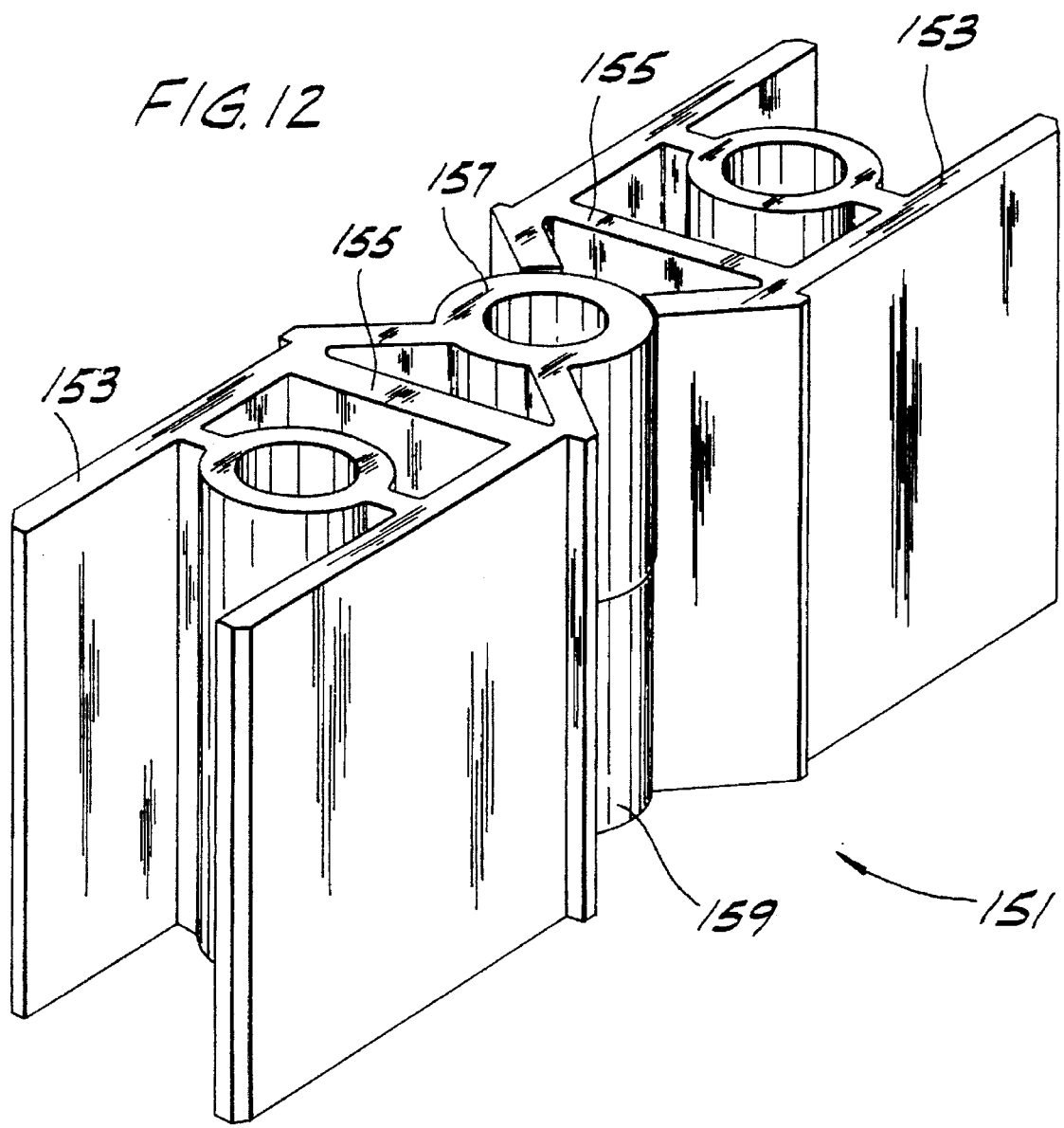

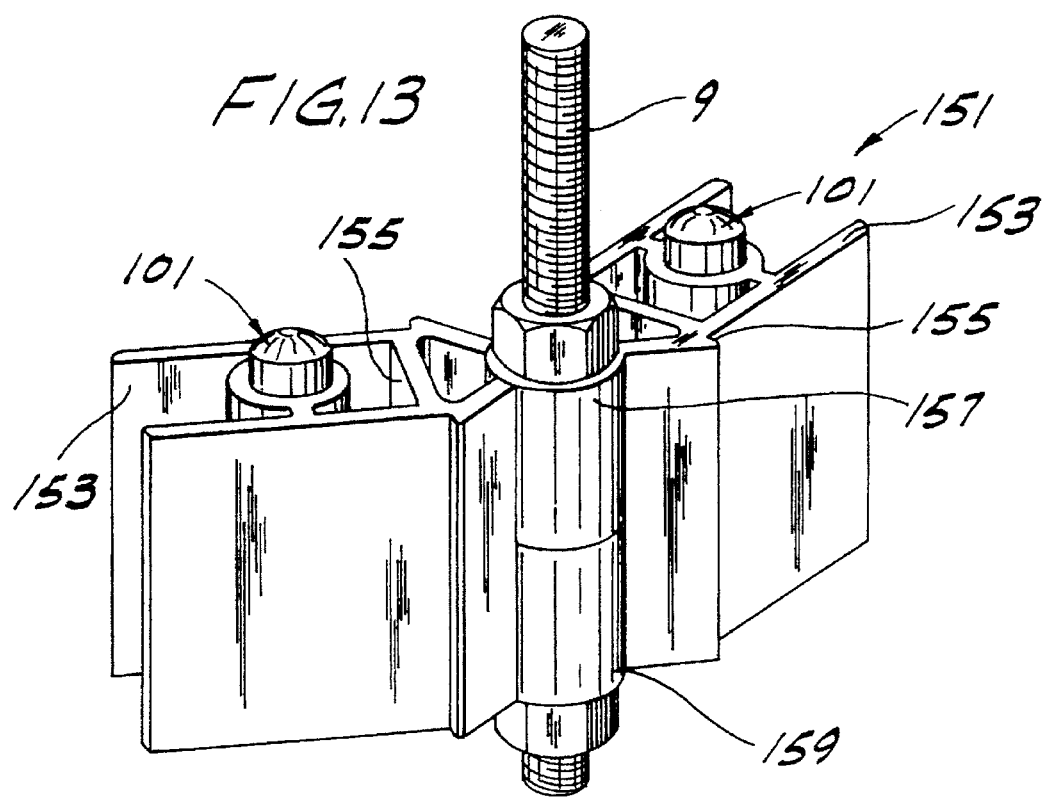
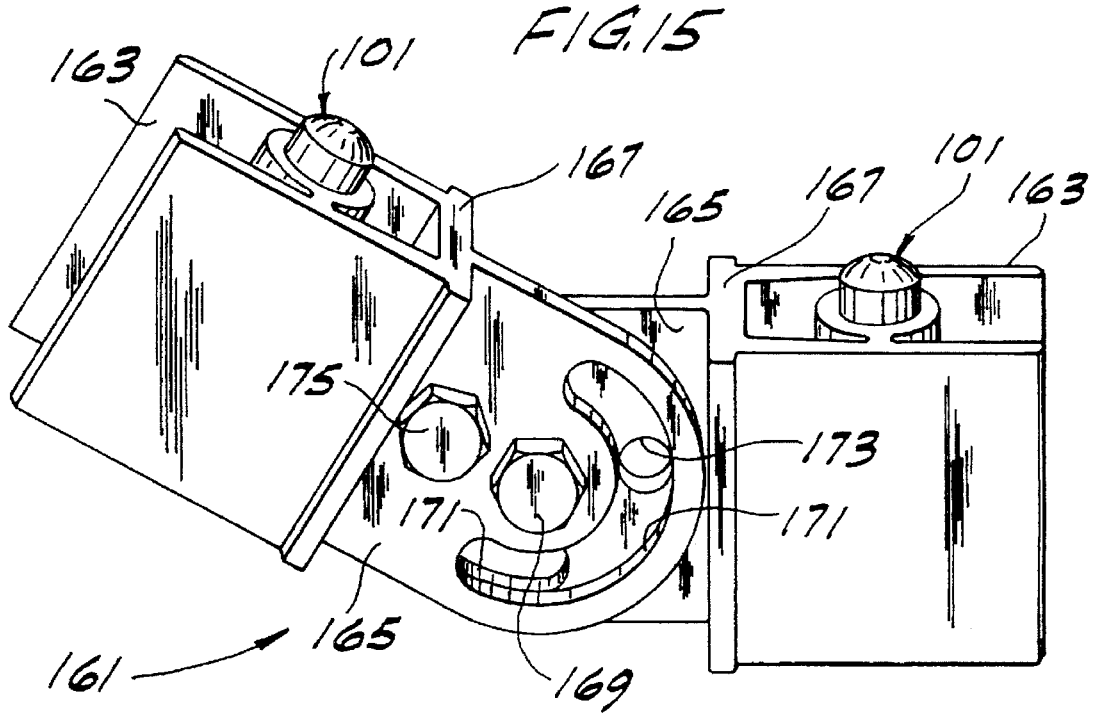

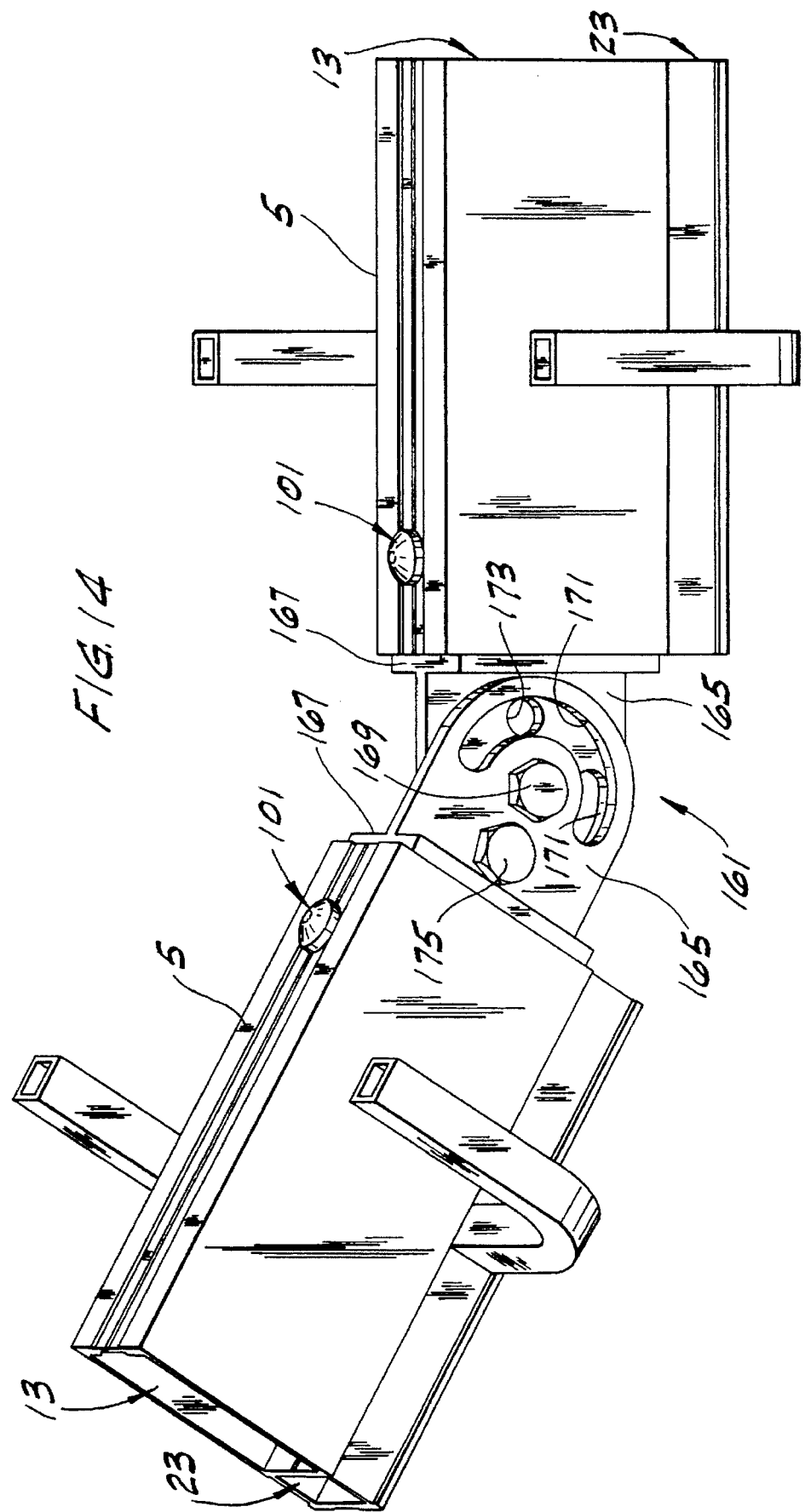

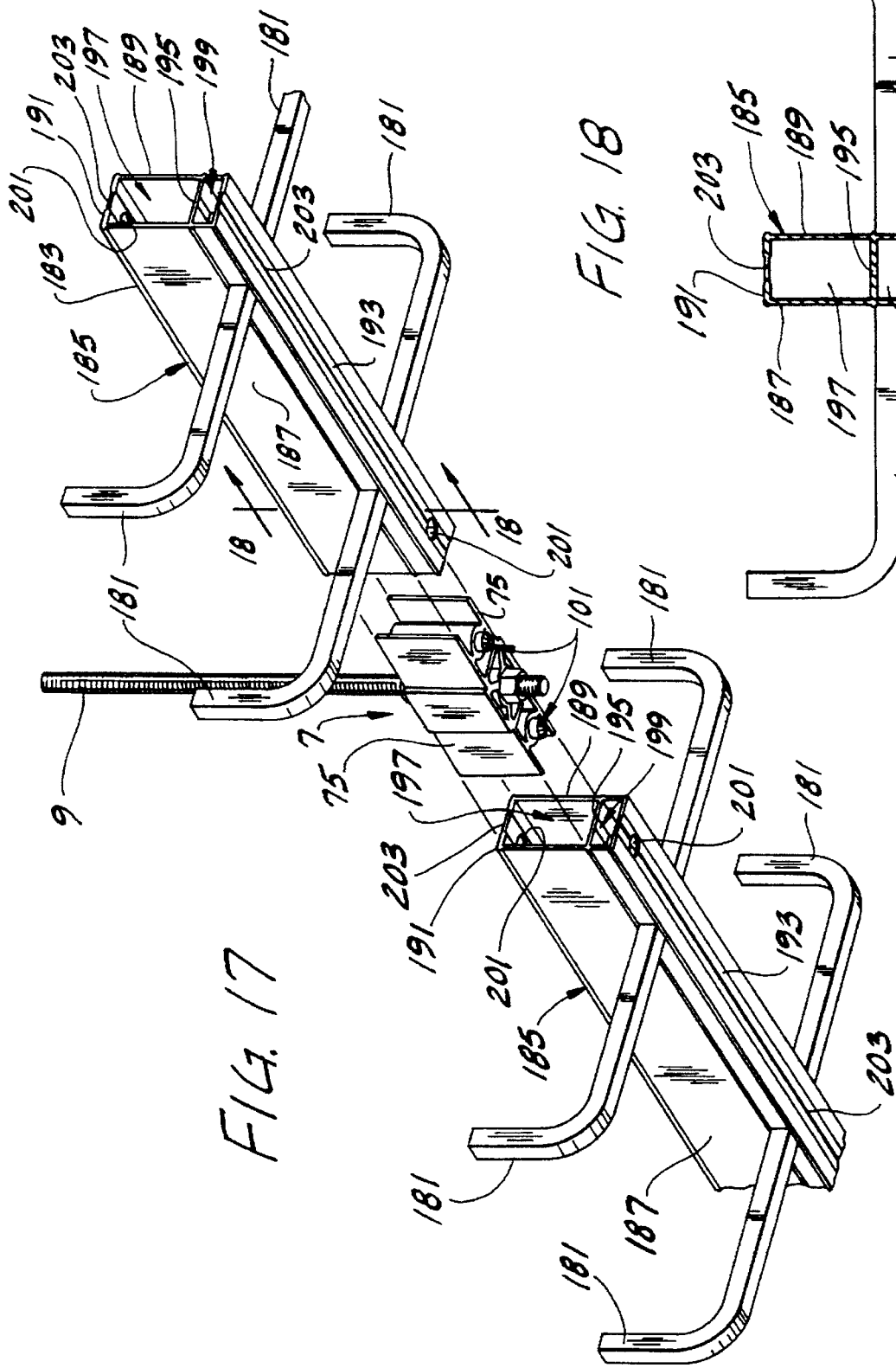

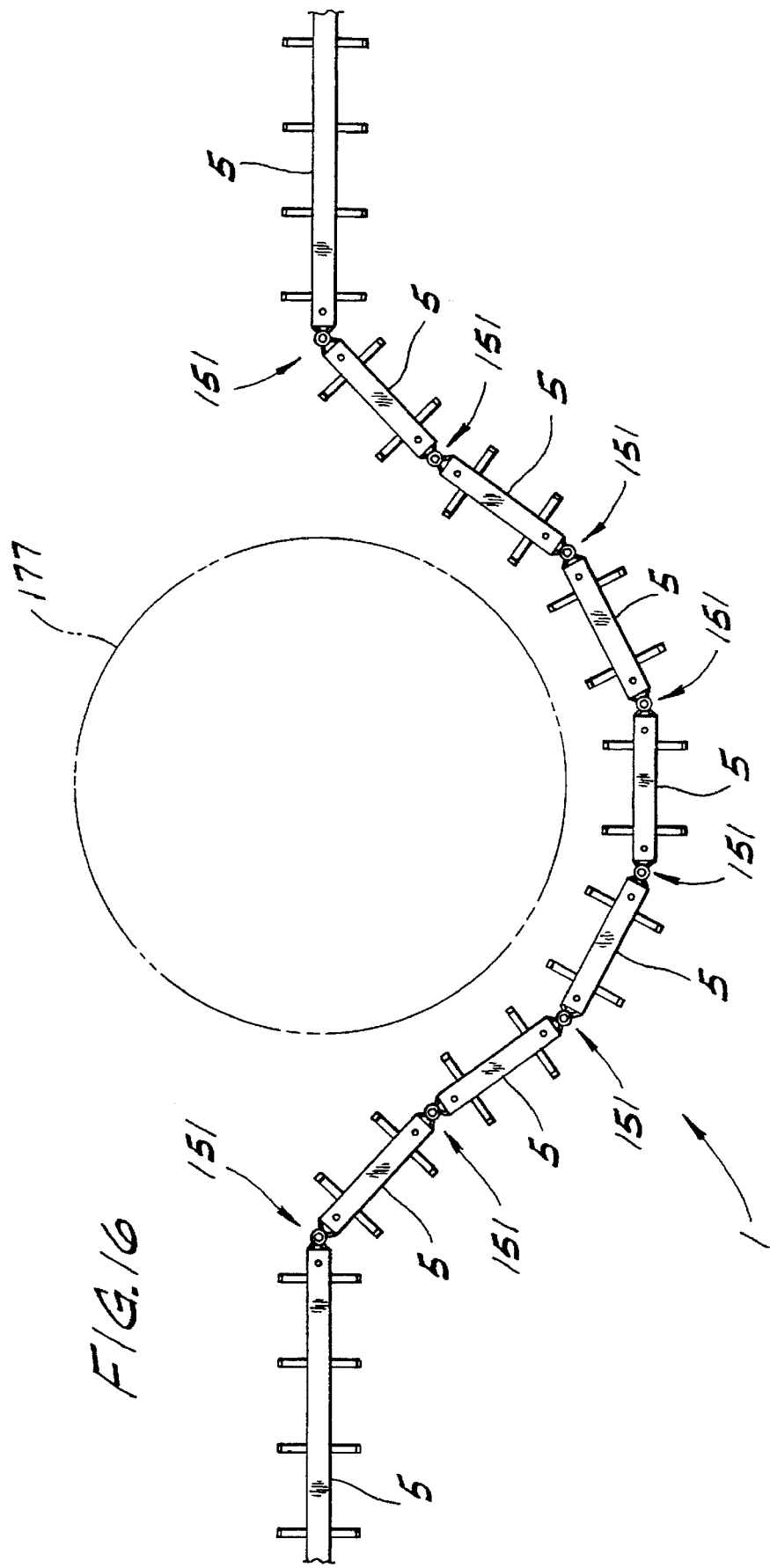

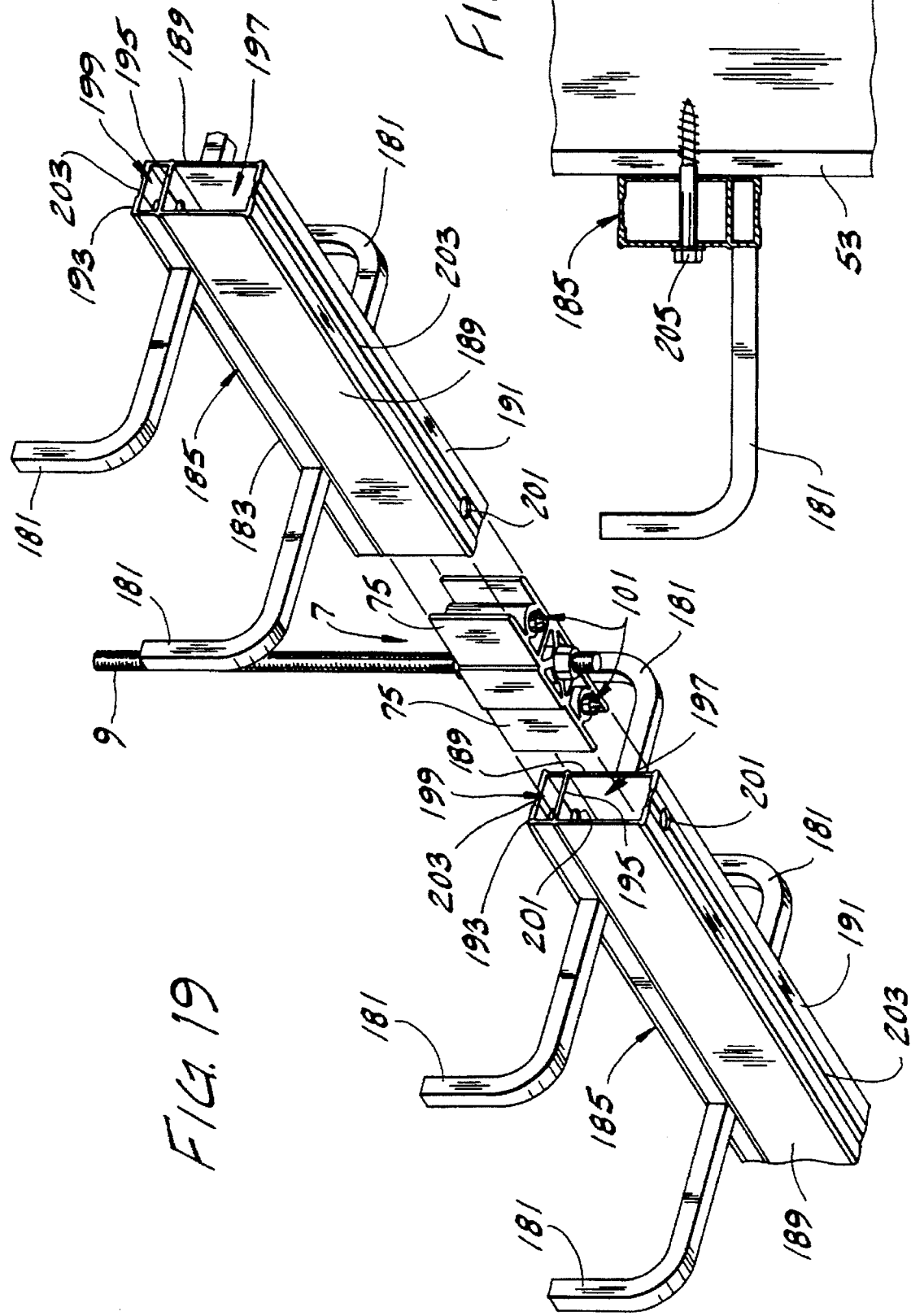

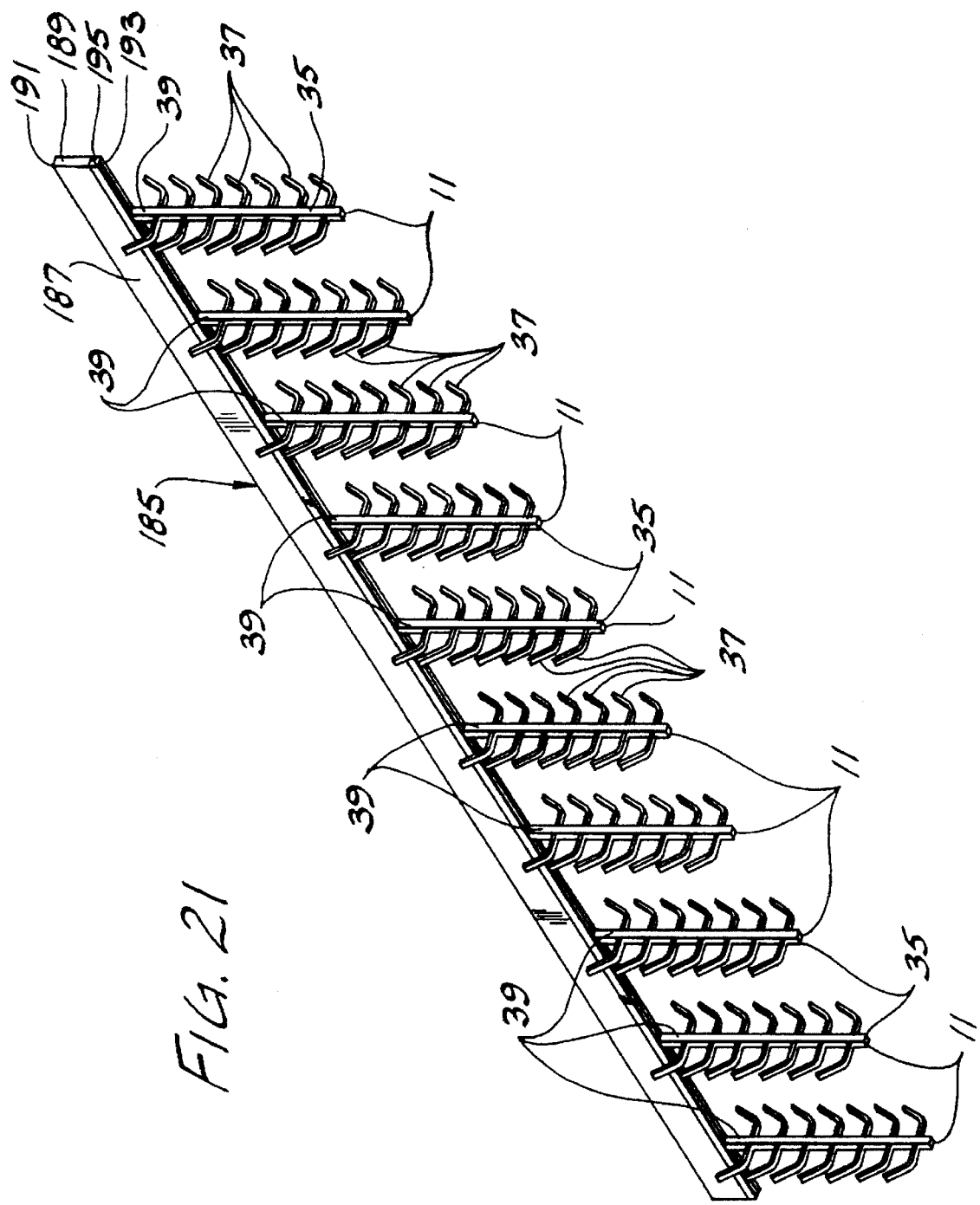

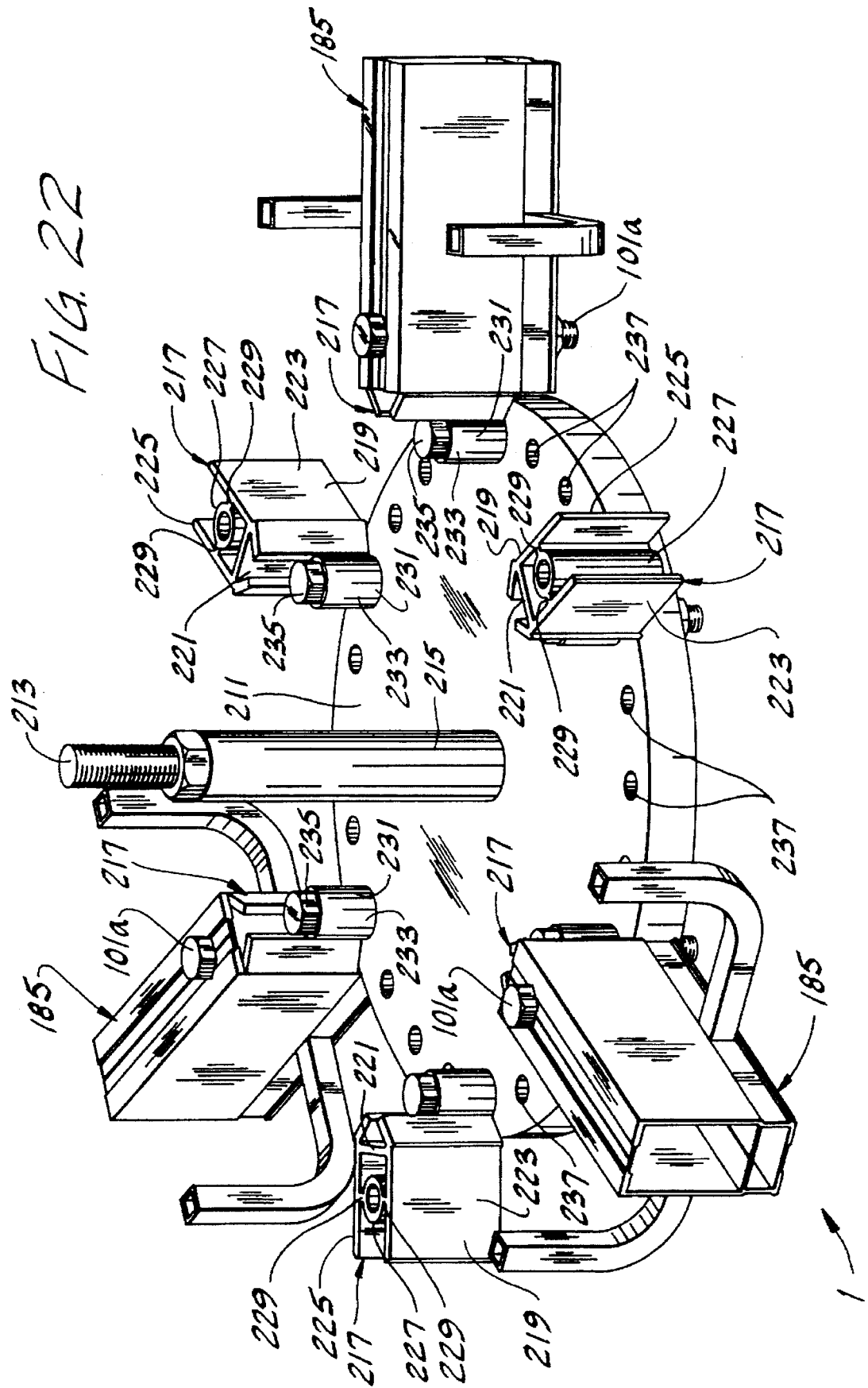

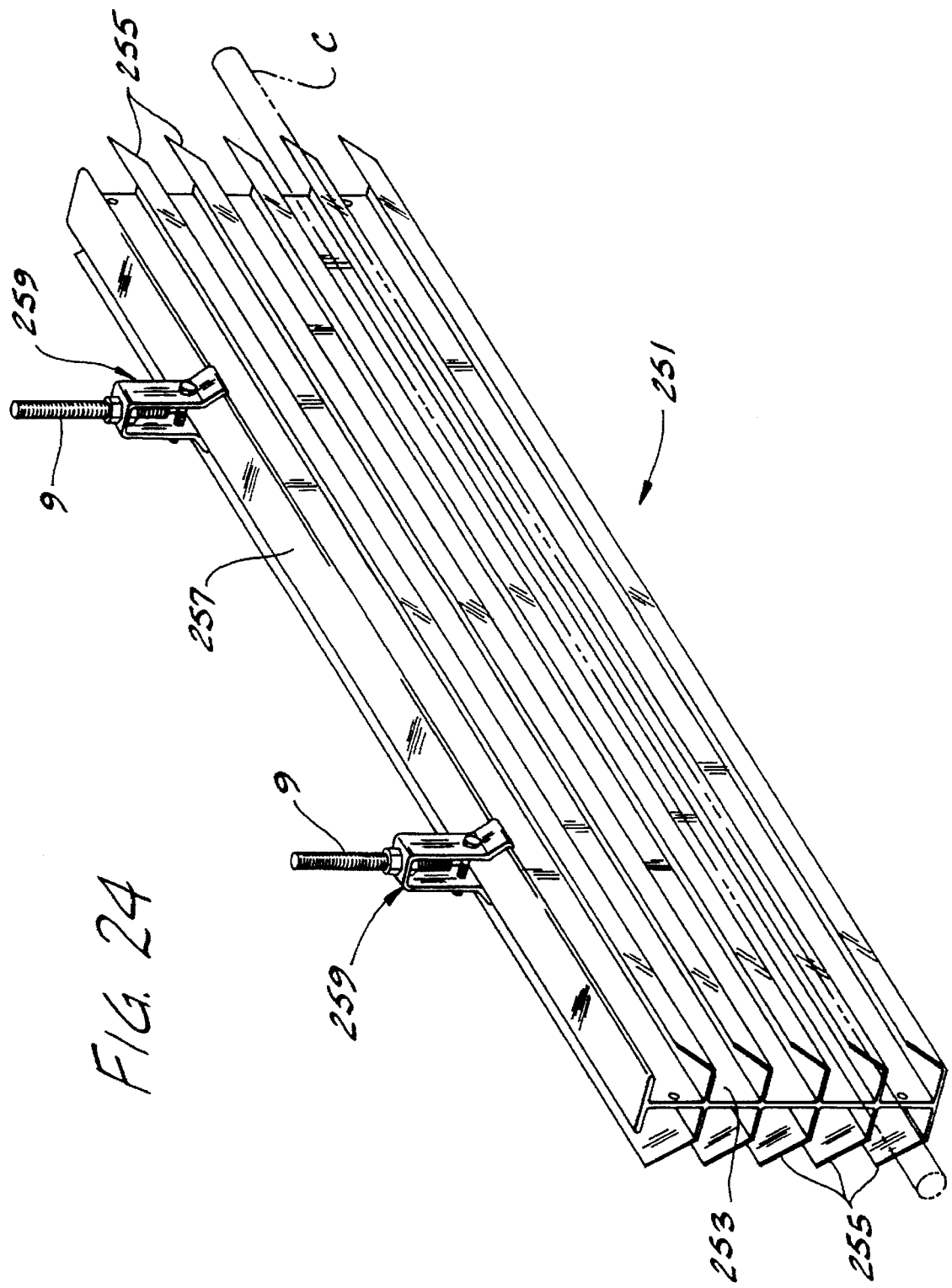

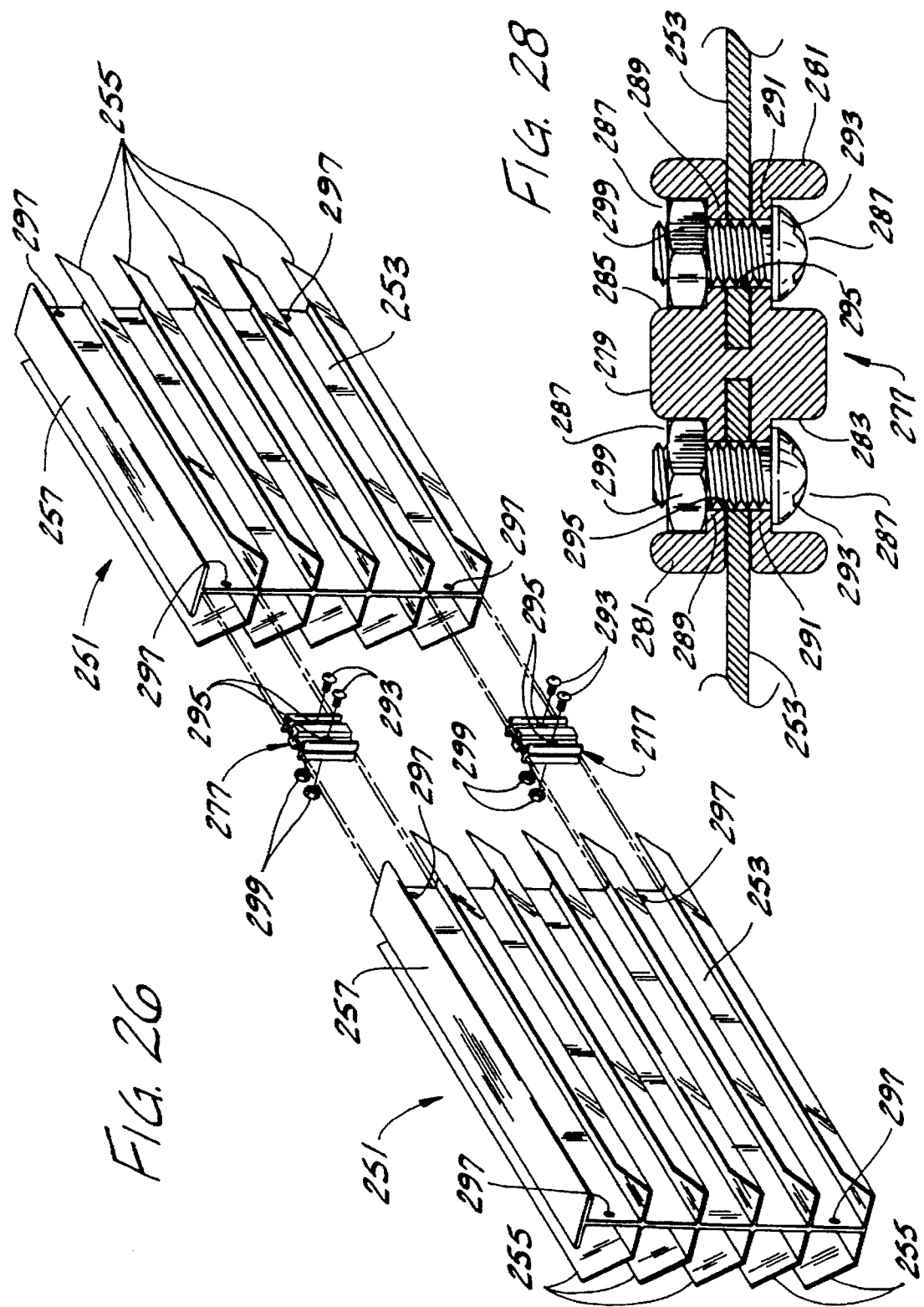

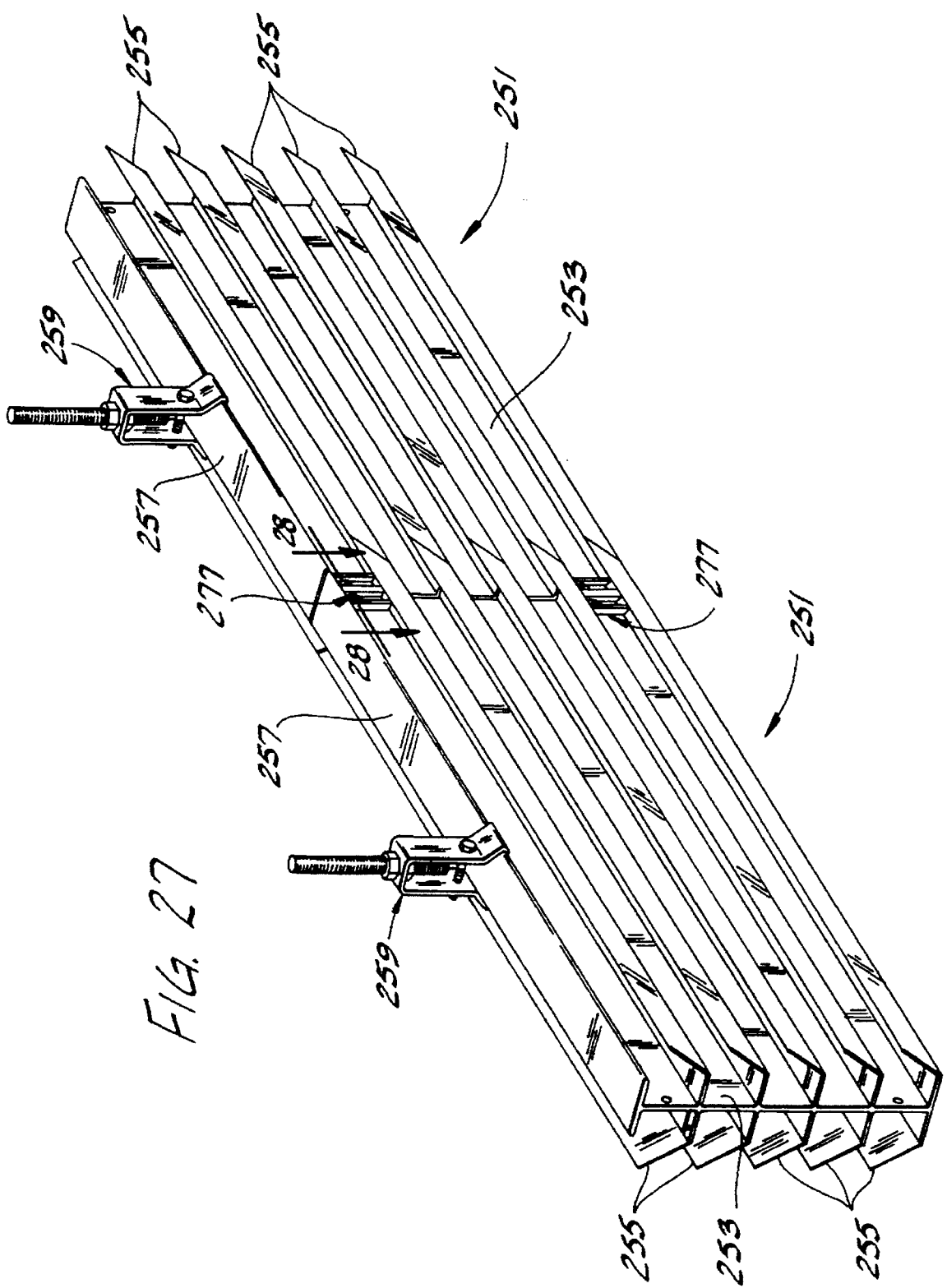

SUPPORT SYSTEM FOR DATA TRANSMISSION LINES

This is a division of application Ser. No. 08/175,591 pending, filed Dec. 29, 1993.

BACKGROUND OF THE INVENTION

This invention relates generally to what is referred to in the industry as "cable tray" systems used to support electrical wiring, cables and conduit, and more particularly to a lightweight cable tray system which is especially adapted for supporting data transmission lines and the like.

For years electrical contractors have used cable tray to support electrical cables and the like in elevated position. One type of conventional cable tray comprises a ladder-like structure made of two parallel rails connected by a series of rungs, typically supported from overhead beams by vertical rods or hangers. This system is of relatively heavy-duty construction for supporting relatively heavy electrical conductors, cable, conduit and the like, and is particularly suited for new construction rather than rehabilitation of existing buildings. Mother type of cable tray comprises a single center rail having a series of arms extending laterally outwardly from opposite sides of the rail. The single center rail is also typically supported by vertical rods or hangers.

The aforementioned types of cable tray are not especially suited for the burgeoning computer and telecommunications industries where a typical installation involves thousands and perhaps millions of runs of data transmission lines, and they are especially ill-equipped for jobs involving the rehabilitation and modernization of existing buildings to include new telephone, computer and other telecommunications systems. In such buildings, there is often insufficient horizontal space between existing ductwork, columns and other structural members to install sufficient cable tray of existing design to carry the multiplicity of lines associated with the new systems being installed in the building. Conventional cable tray systems are too bulky, too inflexible in their ability to snake through existing corridors of space, and too expensive. Moreover, they are unable to efficiently separate and segregate different groups of data transmission lines according to function, application, or other criteria to make installation, repair and/or replacement more convenient.

There is a need, therefore, for a new and inexpensive cable tray system especially suited for computer and telecommunications applications, and particularly adapted for use in existing buildings where available corridors of space are limited, especially in the horizontal direction.

Another problem associated with conventional cable tray systems is that assembly and installation of the system requires the use of nut and bolt fasteners. The use of such fasteners is not only burdensome and time-consuming, but any misplacement or droppage of metal parts in a telecommunications area can cause significant disruptions and possible damage to sensitive electrical equipment.

There is a further need, therefore, for a support system which can be quickly and easily assembled and installed with little or no use of metal nut and bolt fasteners.

SUMMARY OF THE INVENTION

Among the several objects of this invention may be noted the provision of a cable tray system which is especially suited for supporting data transmission lines and the like; the provision of a cable tray system which is lightweight and strong but relatively inexpensive; the provision of such a system which is able to take greater advantage of vertical corridor space for carrying a greater number of electrical conductors, data transmission lines, and the like; the provision of such a system which is capable of segregating different lines at different vertical elevations according to selected criteria; the provision of such a system which is constructed so that it can readily "snake" (weave) through tortuous corridors of space to accommodate existing ductwork, columns, structural members and other blocking structures; the provision of such a cable tray system in which connected sections of cable tray are continuously electrically conductive; the provision of such a system in which the connections between adjacent cable tray sections are smooth and continuous to avoid snagging and/or damage to the lines being carried by the system; the provision of such a system which eliminates the exposure of lines being carried by the system to fasteners and other elements which might cause snagging of the lines and/or damage to the lines; the provision of such a system in which the capacity of the cable tray may be increased by adding extensions in the vertical direction; the provision of such a system in which adjacent cable tray sections are readily connectable without the use of conventional fasteners (e.g., nut and bolt fasteners); the provision of such a system which meets existing electrical codes and standards (e.g., the National Electric Code, and the standards of the Telecommunications Industry Association and Electronic Industry Association); the provision of such a system which has a minimum number of component parts to facilitate installation of the system; and the provision of such a system which permits ready routing of data transmission lines.

In general, a support system of this invention for data lines and the like comprises a plurality of rail sections, a hub adapted to be supported at a fixed elevation, and a plurality of rail connectors for connecting the rail sections to the hub in positions in which the rail sections radiate out from the hub.

Other objects and features will be in part apparent and in part pointed out hereinafter.

BRIEF DESCRIPTION OF THE DRAWINGS

FIG. 1 is a perspective of a support system of the present invention for supporting data transmission lines and the like;

FIG. 2 is an enlarged perspective of a rail section of the support system;

FIG. 3 is a cross section taken along line 3—3 of FIG. 1;

FIG. 4 is a cross section of an alternative embodiment of the support system illustrated in FIG. 1;

FIG. 5 is a perspective of another alternative embodiment of the support system shown in FIG. 1;

FIG. 8 is a perspective of the splice with portions removed to reveal a detent for releasably connecting the splice to a rail section;

FIG. 8A is a cross section of the splice and detent of FIG. 8 showing the splice connected to a rail section;

FIG. 9 is a perspective of a splice of an alternative embodiment;

FIG. 12 is a perspective of a "pivot" splice with parts adapted to pivot about a generally vertical axis;

FIG. 13 is a perspective of the pivot splice of FIG. 12 supported by a rod;

FIG. 14 is a perspective of a pivot splice releasably connecting two rail sections;

FIG. 15 is a perspective of the pivot splice of FIG. 14 with parts adapted to pivot about a horizontal axis;

FIG. 16 is a top plan of the support system incorporating pivot splices for weaving around structural elements such as a column;

FIG. 17 is a perspective of the support system illustrating rail sections and supports of another embodiment;

FIG. 18 is a cross section taken along line 18—18 of FIG. 17;

FIG. 19 is a perspective similar to FIG. 17 with the rail sections inverted;

FIG. 20 is a cross section of an alternative embodiment of the support system shown in FIGS. 17-19;

FIG. 21 is a perspective of an alternative support system;

FIG. 22 is a perspective of a hub adapted for use with the support system;

FIG. 24 is a perspective of a support structure of an alternative embodiment having a plurality of tray members;

FIG. 26 is an exploded perspective of two support structures as shown in FIGS. 24 and 25, and a pair of splices for connecting the two support structures;

FIG. 27 is a perspective of two support structures interconnected by pair of splices and suspended by a pair of hangers; and FIG. 28 is a cross section taken along line 28—28 of FIG. 27.

Corresponding parts are designated by corresponding reference numerals in the several views of the drawings.

DESCRIPTION OF PREFERRED EMBODIMENTS

Figure 1:
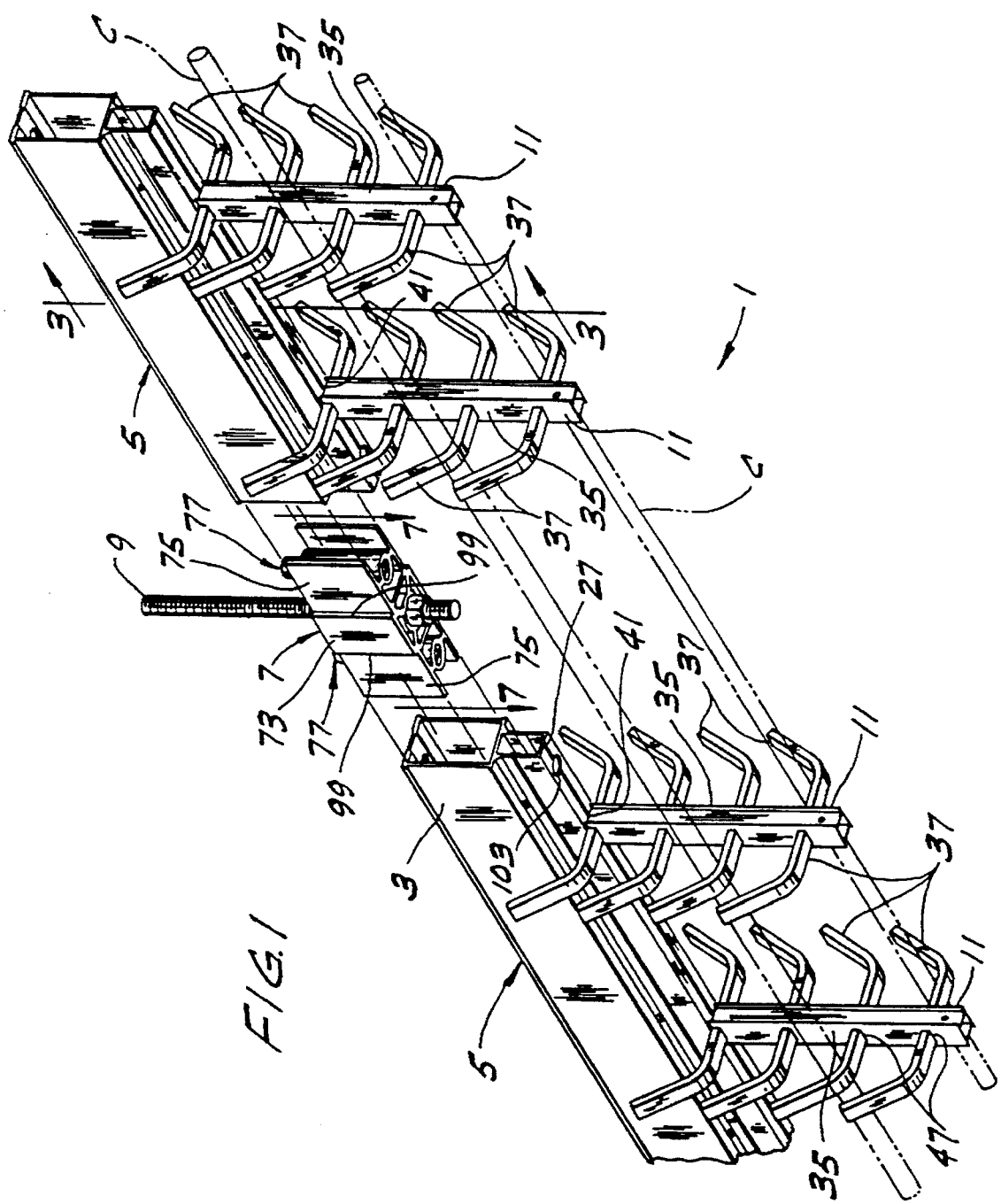

Referring now to the drawings, and first to FIG. 1, a support system for data transmission lines and the like is generally indicated at 1. The system 1 is shown as comprising 5 a rail 3 divided into a plurality of rail sections, each section being generally designated 5, and splices (one of which is shown in FIG. 1 and indicated generally at 7) for connecting the rail sections end to end. The rail sections 5 are typically supported in horizontal position by vertical rods or hangers 9 (one such rod being shown in FIG. 1), but it will be understood that the rail sections can be supported in other orientations (e.g., vertical or at an angle) without departing from the scope of this invention. The system 1 also includes a plurality of supports, each designated 11, extending down from the rail sections 5 at intervals spaced along the rail sections. As will be described in more detail later in this specification, these supports 11 are designed to support a series of horizontal runs of data transmission lines and the like (e.g., electrical cable, conductors, conduit) (designated C in the drawings) at different vertical elevations.

As illustrated in FIG. 2, each rail section 5 has an upper box beam portion, generally indicated at 13, comprising a top wall 15, opposite side walls, each designated 17, and a bottom wall 19, all of which combine to define an upper interior space indicated at 21. The rail section 5 is also formed to have a lower portion 23 comprising a pair of generally parallel, spaced apart vertical legs, each designated 25, extending down from the bottom wall 19 of the upper box beam portion 13, and a lower wall 27 spaced below the bottom wall of the upper box beam portion. The lower portion 23 of the rail section 5 defines a lower interior space 29. The underside of the bottom flange 27 has a groove 31 therein running the length of the channel generally along the longitudinal vertical centerline of the rail section 5. Similar grooves, each of which is also designated 31, are formed in the upper surface of the top wall 15 of the upper box beam portion 13 and in the upper and lower surfaces of the bottom wall 19 of the upper box beam portion. These grooves 31 facilitate field drilling of holes in the rail sections 5 for reasons which will be described later. The central longitudinal portions of top wall 15, bottom wall 19 and lower wall 27 are of reduced thickness to further facilitate field drilling. The rail section 5 is of suitable material, typically metal (e.g., aluminum), but it may be also be of plastic in certain applications. It is preferably a one-piece extrusion which is cut to suitable length either in the factory or in the field.

Each support 11 comprises a generally vertical column 35 (referred to hereinafter as a "trunk") extending down from a respective rail section 5, and a series of arms 37 extending laterally outwardly from the trunk 35 along the length of the trunk at different elevations, the arrangement being such that the arms 37 of each support 11 cooperate with the arms 37 of the other supports 11 for supporting a series of horizontal runs of data transmission lines and the like at the aforesaid different elevations.

The trunk 35 is preferably an extruded tubular member of generally rectangular cross section, the upper end 39 of which extends up through an opening 41 in the lower wall 27 of the rail section 5 and abuts against the bottom wall 19 of the upper box beam portion 13 of the rail section. The opening 41 through which the trunk 35 extends may be formed by cutting three sides of the opening and bending the resultant flap up into the interior of the lower portion 23 of the rail section 5. The trunk 35 is secured in place by a suitable screw fastener 45 threaded through one vertical leg 25 of the lower portion 23 of the rail section 5 into the trunk. A horizontal groove 31 extending the length of each vertical leg 25 facilitates proper placement and installation of this screw fastener through either leg of the lower portion 23 of the rail section 5. It is preferable that the trunk 35 be dimensioned so that it has a relatively snug fit between the two legs 25 of the lower portion 23 of the rail section 5 so that when the screw fastener 45 is in place, the trunk is stably secured in position relative to the rail section.

In the embodiment shown in FIG. 3, two arms 37 extend laterally outwardly from opposite sides of the trunk 35 at a plurality of different elevations (e.g., four elevations). Each pair of arms 37 may be made from a single extruded tubular member, preferably of non-circular (e.g., rectangular) cross section, extending through openings 47 in opposite sides of the tubular trunk 35 having shapes corresponding to the cross sectional shapes of the tubular members forming the arms. The benefit of using non-circular shapes is that the arms 37 are held against rotation with respect to the trunk 35. Also, the non-circular shapes are preferably such as to provide relatively broad flat surfaces for stably and safely supporting the lines thereon. Suitable means may be used to hold the arms 37 against lateral shifting relative to the trunk 35. For example, the arms 37 may be staked immediately adjacent the trunk on opposite sides of the trunk 35. As illustrated in FIG. 3, each arm 37 has a straight horizontal inner section 49 and an upwardly and outwardly bent outer section 51, but it will be understood that the arms may have other configurations. The upper two arms 37 preferably abut the underside of the lower wall 27 of the lower portion 23 of the rail section 5.

FIG. 4 shows an alternative embodiment where each rail section 5 is attached to a vertical wall 53 by means of a threaded fastener 55 extending horizontally through the upper box beam portion 13 of the rail section 5 and into the wall. In this embodiment, the arms 37 extend laterally outwardly from each trunk 35 at only one side of the trunk.

FIG. 5 shows still another support design in which the arms 37 extend laterally out from the trunk 35 at four sides of the trunk. More specifically, the pairs of arms 37 alternate in their direction of extension from the trunk 35, with the top pair of arms 37 extending out from a first pair of opposite sides of the trunk 35, the next lower pair extending out from a second pair of opposite sides of the trunk, the next lower pair extending out from the first pair of opposite sides, etc. The arrangement is such that the two arms 37 at each elevation are 90 degrees offset with respect to the arms 37 immediately above and/or below. Other arrangements of arms 37 on the trunk 35 may also be used without departing from the scope of this invention.

It will be understood from the foregoing that the arms 37 of one support 11 cooperate with the arms 37 of other supports 11 on the rail sections 5 for supporting runs of data transmission lines and the like. As noted, the rail sections 5 and supports 11 are preferably extruded members to ensure economical manufacture of high quality parts having consistent dimensions. Moreover, these parts are formed with rounded edges and other design features intended to minimize the risk of snagging or damage to lines being carried by the system.

Figure 6:
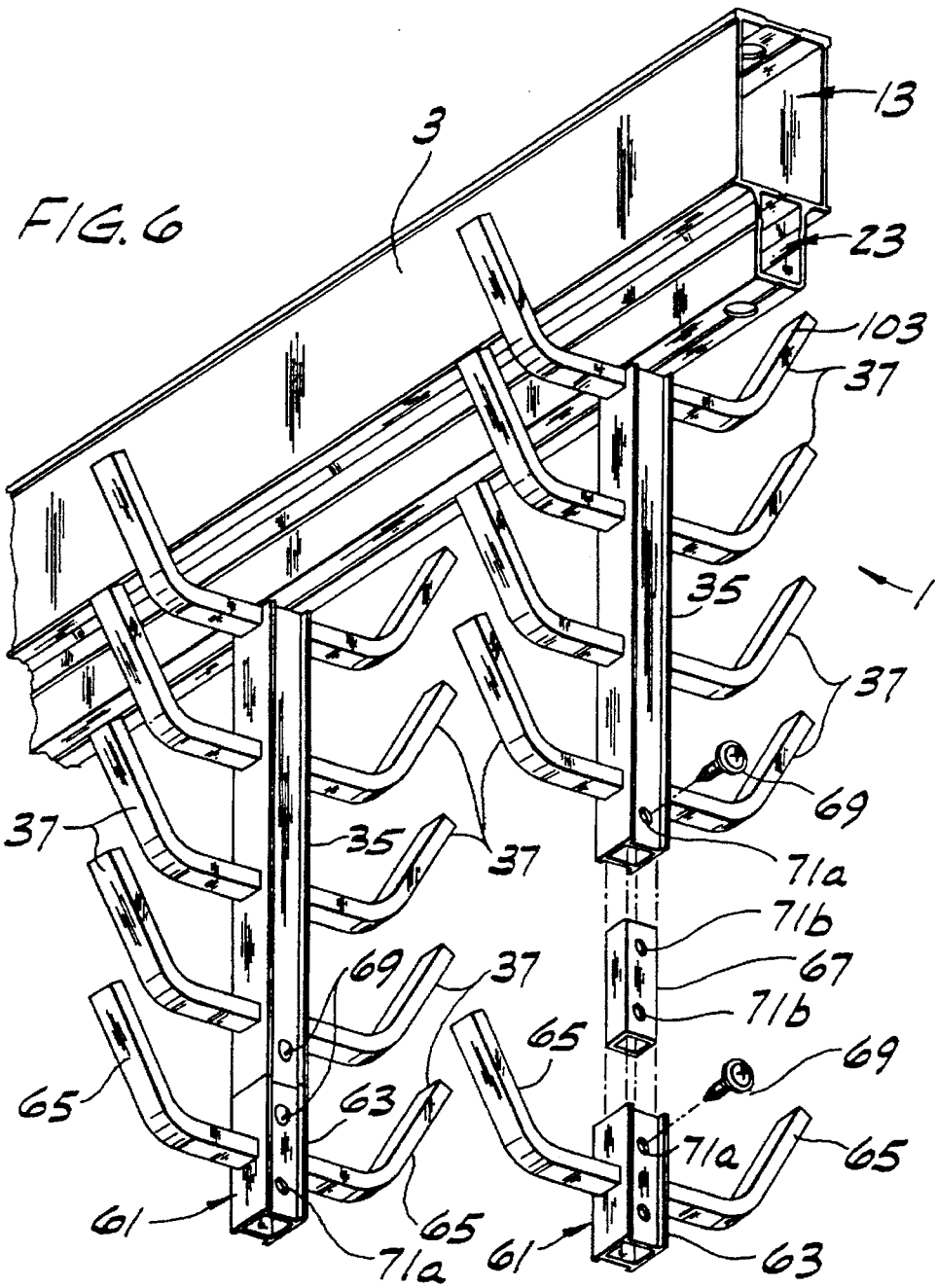
FIG. 6 is a view of the support system illustrated in FIG. 1 having extensions which extend the vertical lengths of supports of the system.

Referring now to the FIG. 6, the system 1 further comprises a plurality of extensions 61 for extending the vertical lengths of the supports 11 in the event this is desirable. Each extension 61 comprises a column or trunk extension 63 adapted to be attached to a lower end of a respective trunk 35, and one or more arms 65 extending laterally outwardly from the trunk extension 63. The cross sectional shapes and configurations of the trunk 63 and arms 65 of the extension are preferable identical to the those of the main trunk 35 and arms 37. Indicated at 67 is means comprising a splice member for attaching the trunk extension 63 to the trunk 35 of a support 11 to be extended. The splice member 67 comprises a tubular member (also preferably a one-piece extrusion) sized for a snug telescoping fit inside the lower end of the main trunk 35 and the upper end of the trunk extension 63. Screw fasteners 69 extending through holes 71a in the trunk 35 and trunk extension 63 and holes 71b in the splice member 67 fasten the main trunk and trunk extension to the splice member. The extension 61 may be as long as needed, with any number of levels of arms 65.

Referring back to FIG. 1, each splice 7 has a central part 73 and a pair of end parts, each designated 75, the end parts 75 being receivable in the upper box beam portions 13 of two rail sections 5 to be connected by the splice 7, and means generally designated 77 for securing the end parts 75 of the splice 7 in respective box beam portions 13 of the two rail sections 5.

Figure 7:
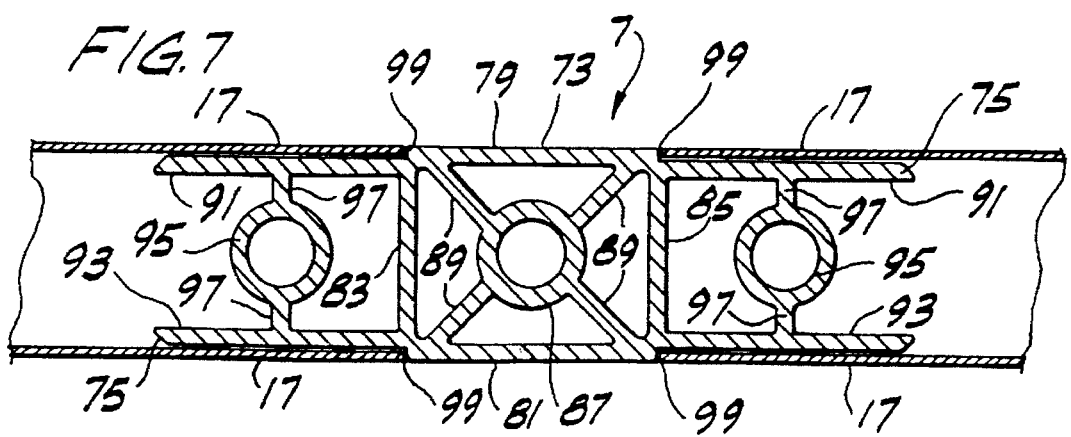
FIG. 7 is an enlarged cross section taken along line 7—7 of FIG. 1 owing a splice of the system interconnecting two rail sections (parts of the system are removed for clarity)

Referring now to FIG. 7, the central part 73 of the splice 7 is generally rectangular in shape, having two opposing generally parallel side walls 79, 81, a pair of opposing generally parallel end walls 83, 85, and a central vertical sleeve 87 defining a vertical bore extending the full height of the splice member 7. The sleeve 87 is connected to the side 79, 81 and end 83, 85 walls by vertical webs 89 extending diagonally with respect to the central part of the splice 7. The sleeve 87 is designed to receive a vertical support rod 9 for suspending the splice 7 (and the two rail sections 5 connected by the splice) from a suitable support structure, such as an overhead beam.

Each end part 75 of the splice 7 has a pair of opposing generally parallel side walls 91, 93 extending endwise from a respective end wall (83 or 85) of the central part 73, a vertical sleeve 95 defining a bore centrally located between the side walls 91, 93 and extending the full height of the splice 7, and vertical webs 97 connecting the sleeve 95 to the side walls 91, 93 of the end part 75. The overall width of each end part 75 as measured from the outside face of one side wall (e.g., side wall 91) to the outside face of the other side wall (e.g., side wall 93) is less than the overall width of the central part 73 as measured from the outside face of one side wall (e.g., side wall 79) to the outside face of the other side wall (e.g., side wall 81), four exterior shoulders 99 thus being formed at the corners of the central part 73.

The spacing between the outer faces of the side walls 79, 81 of the central part 73 of the splice 7 corresponds to the spacing between the outer faces of the side walls 17 of the box beam portions 13 of the two rail sections 5 being connected by the splice 7 member so that when the end parts 75 of the splice are received in the box beam portions 13 of the rail sections 5, the outer faces of the side walls 79, 81 of the central part 75 of the splice 7 are essentially coplanar (flush) with the outer faces of the side walls 17 of the box beam portions 13 of the rail members 5, and the end edges of the rail sections 5 abut the shoulders 79 at the corners of the central part 73 of the splice 7 (see FIG. 7). This design forms a flush, gapless interconnection between the splice 7 and the rail sections 5 and avoids exposing sharp and/or protruding edges to lines carried by the support system 1, thereby preventing snagging and/or possible damage to the lines.

Because rail sections 5 are often cut to length in the field, resulting in relatively rough saw-cut end edges, it may be desirable to have the distance between the outside faces of the side walls 79, 81 of the central part 73 of the splice 7 be slightly greater (0.002) than the distance between the outside faces of the side walls 17 of the box beam portions 13 of the rail sections 5, so that the side walls 79, 81 of the central part 73 of the splice 7 project slightly laterally outwardly beyond the relatively rough cut end edges of the rail sections 5, thereby to further protect the lines carried by the system 1.

The fit of the end parts 75 of the splice 7 in the interior spaces 21 of the upper box beam portions 13 of the two rail sections 5 being connected is a relatively snug fit. That is, the distance between the outer faces of the side walls 91, 93 of the ends parts 75 is only slightly less than the distance between the inside faces of the side walls 17 of the box beam portions 13, and the overall height of the end parts 75 is only slightly less than the distance between the inside surfaces of the 15 top and bottom 19 walls of the box beam portions 13.

The end edges of the side walls 91, 93 of the splice 7 are tapered (beveled) to facilitate insertion of the end parts 75 of the splice into the interior spaces 21 of the box beam portions 13 of respective rail sections 5. The fit of the end parts 75 inside the box beam portions 13 is preferably a close fit to provide the stabilization necessary for a good connection. Also, in a system where the rail sections 5 and splices 7 are of metal, this close fit ensures a continuous electrical connection (for grounding purposes) between the rail sections 5.

The central part 73 and end parts 75 of the splice 7 are preferably integrally formed as a one-piece extrusion from the same material used to form the rail sections 5. To form a splice 7, a continuous extrusion having a cross sectional shape corresponding to that of the splice 7 is simply cut to a length corresponding to the height of the splice.

Means 77 for securing the end parts 75 of the splice 7 in respective box beam portions 13 of the two rail sections 5 comprises a snap fastener, generally designated 101, on each end part 75 of the splice 7 receivable in an opening 103 in a box beam portion 13 of a respective rail 5 (FIG. 8A). The opening 103 for receiving this snap fastener 101 is preferably in either the top 15 or bottom 19 wall of the box beam portion 13, as opposed to being in a side wall 17 where the fastener 101 might interfere with the lines being carried by the supports.

The snap fastener 101 comprises a cylindric detent 105 with a rounded end mounted in the sleeve 95 of each end part 75 of the splice 7 for movement between a retracted position for enabling the end part 75 to be inserted into the interior space 21 of a box beam portion 13 of a respective rail section 5, and a locking position in which the detent 105 projects out of one end of the sleeve 95 and is received in the opening 103. As best shown in FIG. 8, a coil spring 107 reacting against a cylindric stop 109 generally adjacent the opposite one end of the sleeve 95 urges the detent 105 toward its locking position. The spring 107 is suitably affixed to the stop 109 and to the detent 105 so that the stop, spring and detent may be inserted as a unit in the bore of the sleeve 95. The stop 109 has a friction fit inside the sleeve 95 to maintain the unit in fixed position after insertion.

The detent 105 preferably projects only a small distance out of the sleeve 95, so that when an end part 75 of the splice 7 is inserted into a respective rail section 5, the rounded part of the detent 105 engages the end of the rail section 5 and is automatically cammed down into the sleeve 95 (against the bias of the spring 107) to permit the splice 7 to be fully inserted into the rail 5. The opening 103 in the top 15 (or bottom 19) wall of the box beam portion 13 of the rail section 5 is positioned so that the detent 105 moves into vertical alignment with the opening 103 substantially at the same time the end edges of the rail section 5 move into abutting engagement with the shoulders 99 on the central part 73 of the splice 7, at which point the detent 105 snaps outwardly under the force of the spring 107 through the opening 103 in the rail section 5 to fasten the splice 7 to the rail section. It will be observed that this connection is achieved without the aid of nut and bolt fasteners, thus minimizing the number of component parts necessary to make the connection. This design also makes assembly much quicker and easier, and avoids the risk of misplacement or droppage of fastener parts which might interfere with the operation of nearby sensitive electrical equipment and the like.

As previously stated, it is preferable that the spring detents 105 snap through openings 103 in the top 15 and/or bottom 19 walls of the box beam portions 13 of rail sections 5. This keeps protruding parts and rough edges away from the sides of the rail sections 5 where the data transmission lines and the like are located. However, it is contemplated that the detent openings 103 may be in the side walls 17 of the rail sections 5 without departing from the scope of this invention.

While use of a snap fastener design of the present invention has certain advantages, it will be understood that other types of fasteners may be used to secure a splice 7 to two rail sections 5 being connected. For example, it may be desirable to use a nut and bolt fastener on occasion. In such cases the end parts 75 of the splice 7 are inserted into the box beam portions 19 of the rail sections 5 until the bores defined by the vertical sleeves 95 of the end parts are vertically aligned with the openings 103 in the top walls 15 of box beam portions 13 of respective rail sections 5. Bolts or threaded support rods may then be inserted through the vertically aligned openings and sleeve bores and secured in place by nuts. It will be noted that such bolts or threaded support rods may extend all the way through the rail sections 5, in which case vertically aligned openings 103 are provided in the top 15 and bottom 19 walls of the upper box beam portion 13 of the rail section 5, and in the lower wall 27 of the lower portion 23 of the rail section 5.

While the use of nut and bolt fasteners and/or threaded rods in this manner does not afford all of the advantages of a snap fastener design of the type described above, the vertical orientation of the fasteners still provides the important advantage of maintaining all projecting fasteners away from the sides of the rail sections 5, thereby avoiding contact with the lines being carried by the system.

The aforementioned grooves 31 in the top 15 and bottom 19 walls of the upper box beam portion of each rail section 5, and in the lower wall 27 of the lower portion 23 of the rail section 5, are to facilitate drilling of the openings 103 for the fasteners (e.g. detents, bolts, support rods) used to secure the splice 7 to the rail section. These grooves function to properly locate the openings 103 (in a lateral direction with respect to the rail section 5) and to provide an initial bite for a drill bit. As noted previously, the central longitudinal portions of the top 15 and bottom 19 walls and the lower wall 27 are of reduced thickness to facilitate drilling any necessary fastener openings.

FIG. 9 shows a splice, generally designated 111, in which the central part of the splice is of two-part construction, one part being indicated at 113 and the other part at 115. Each of the two parts 113, 115 extends the full height of the splice 111 and forms a part of the vertical sleeve defining bore 117. Means comprising a plurality threaded fasteners, each designated 119, are threaded into aligned bores (not shown) in the two parts 113, 115 for removably fastening the two parts together, so that one part may be detached from the other to permit side entry of a support rod (e.g., rod 9) into the bore 117 defined by the sleeve, followed by reattachment of the two parts. This design is particularly useful where the support rod 9 is located so that its lower end is not readily passable through the central sleeve defining bore 117 of the splice 111.

Figure 10:
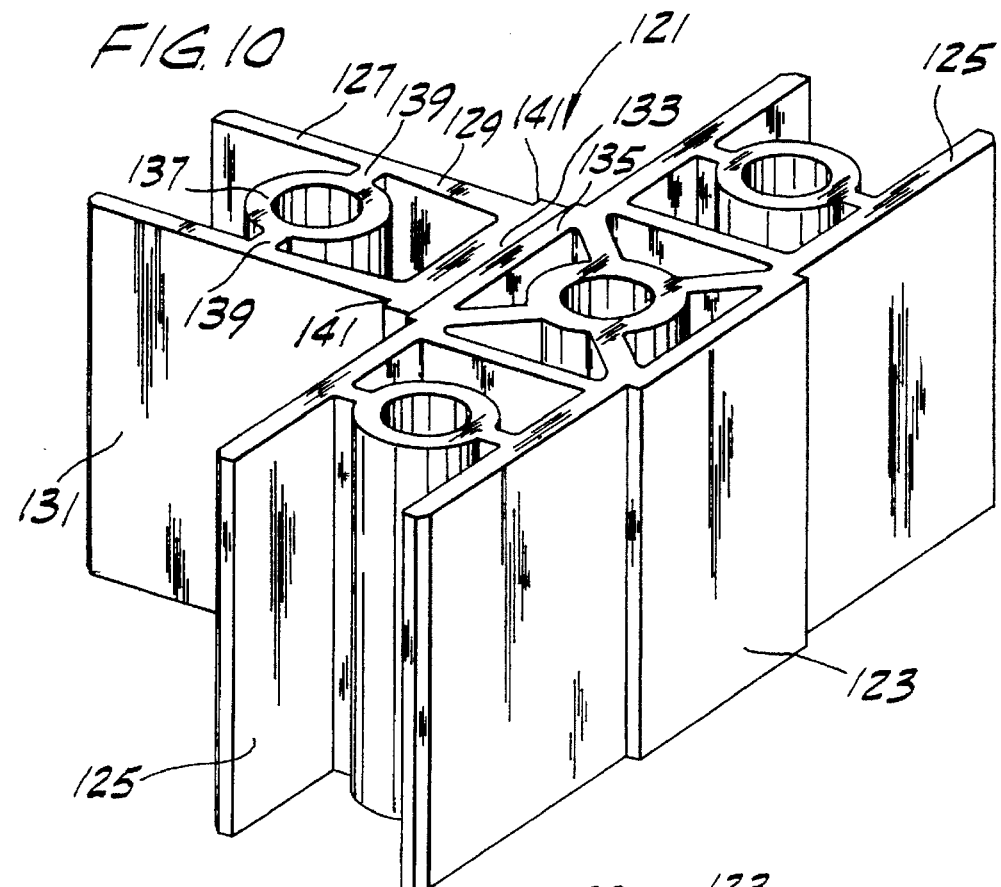
FIG. 10 is a perspective of a "tee" splice.

FIG. 10 shows a tee splice 121 for connecting three rail sections at 90 degrees relative to one another. The splice has a central part 123 like the central part 73 of the straight splice 7 described above, a pair of end parts, each designated 125, like the end parts 75 of the straight splice 7 previously described, and a side part 127 extending laterally from the central part 123. The side part 127 has a pair of side walls 129, 131, an end wall 133 affixed (as by welding) face-to-face with a side wall 135 of the central part 123 of the splice 121, and a vertical sleeve 137 centrally supported between the side walls 129, 131 by a pair of webs 139. The end parts 125 and side part 127 are adapted to be inserted into the upper box beam portions 13 of three rail sections 5 to be connected until the vertical bores defined by the sleeves 137 are vertically aligned with openings 103 in the rail sections 5. Means comprising fasteners (e.g., snap fasteners 101, nut and bolt fasteners, threaded support rods) extending through the aligned bores of sleeves 137 and openings 103 are used to secure the end 125 and side parts 127 of the splice 121 in respective rail sections 5, as described previously in connection with the straight splice 7. The side part 127 of the tee splice 121 is formed with a pair of shoulders 141 engageable by the end edges of a rail section 5 to provide a flush, gapless connection between the outside surfaces of the side walls 17 of the upper box beam portion 13 of the rail section 5 and the vertical end surfaces of the end wall 133 of the side part 127 of the splice 121. The end edges of the side part 127 and end parts 125 of the splice 121 are tapered to facilitate insertion of the parts into respective rails sections 5.

Figure 11:
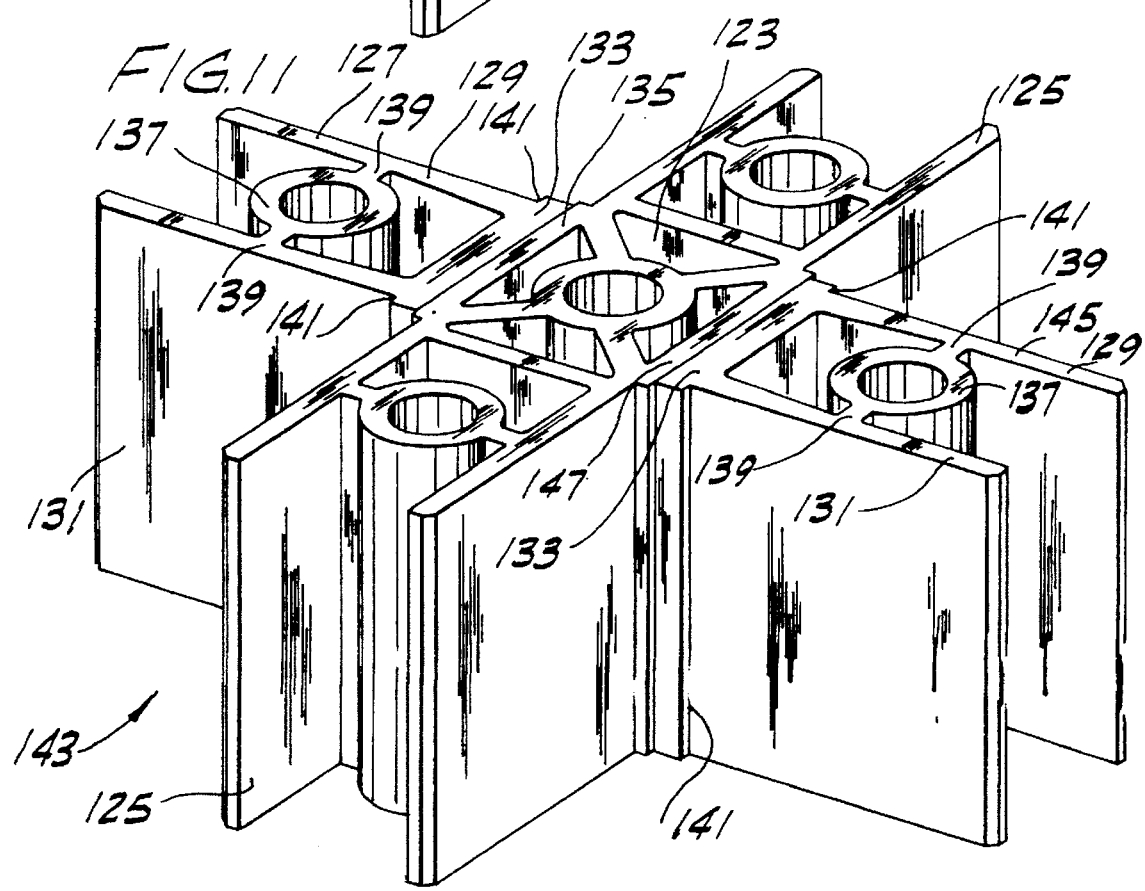
FIG. 11 is a perspective of a "cross" splice.

FIG. 11 shows a cross splice 143 for connecting four rail sections in a cross formation at 90 degrees relative to one another. The splice 143 is identical to the tee-splice 121 described above except that it has a second side part 145 identical to side part 127 extending from the opposite side wall 147 of the central part 123 of the splice 143 (for identification purposes, corresponding parts of the two side parts are designated by the same reference numerals). The end parts 125 and side parts 127, 145 of the cross splice 143 are adapted to be inserted into the upper box beam portions 13 of four rail sections 5 to be connected until the vertical bores defined by the sleeves 137 are vertically aligned with openings 103 in the rail sections 5. Means comprising fasteners (e.g., snap fasteners 101, nut and bolt fasteners, threaded support rods) extending through the aligned bores of sleeves 137 and openings 103 are used to secure the end 125 and side parts 127, 145 of the splice 143 in respective rail sections 5, as described previously in connection with the straight splice 7.

FIG. 12 illustrates a pivot splice of the present invention, generally designated 151, having a pair of end parts, each designated 153, receivable in the upper box beam portions of two rail sections to be connected. The end parts 153 of this splice 151 are substantially identical to the end parts of the splices previously described, except that the end wall 155 of one end part 153 is formed with an upper sleeve part 157 and the end wall 155 of the other end part is formed with a lower sleeve part 159. The two end parts 153 are adapted to be used as shown in FIG. 13, with the upper and lower sleeve parts 157, 159 combining to form a single vertical sleeve for the reception of a vertical pivot member (i.e., rod 9) therethrough to permit pivoting of the end parts 153 relative to one another about the vertical axis of the pivot member. This in turn permits the two rail sections 5 connected by the splice 151 to pivot relative to one another in a generally horizontal plane. Each end part of the splice 151 is provided with a fastener (e.g., a snap fastener 101 as shown in FIG. 13) for securing the end part 153 to the rail section 5 in which the end part is received.

It will be observed that the two end parts 153 of the vertical pivot splice 151 and their respective sleeve parts 157, 159 are formed as integral one-piece parts that are identical in construction. That is, the upper vertical sleeve part 157 and its respective end part 153 are integrally formed as a single (first) piece, and the lower vertical sleeve part 159 and its respective end part 153 are integrally formed as a single (second) piece, the two (first and second) pieces being identical pieces which can be used interchangeably.

FIG. 14 shows a pivot splice, generally indicated at 161, for use in the system of this invention for permitting relative pivoting between adjacent rail sections 5 about a generally horizontal axis. The splice 161 comprises a pair of end parts, each designated 163, receivable in the upper box beam portions 13 of two rail sections 5 to be connected. The end parts 163 of this splice 161 are substantially identical to the end parts 153 of the splices 151 previously described, except that a vertical plate 165 extends endwise from the end wall 167 of each end part 163. The two end parts 163 are adapted to be used as shown in FIG. 15, with the two plates 165 face-to-face and pinned together by a pivot member 169 (e.g., a nut and bolt fastener) for pivoting of the plates 165 and their respective end parts 163 about the horizontal axis of the pivot member 169 to any selected position of angular adjustment. Each plate 165 is also provided with an arcuate slot 171 and a circular hole 173, the arrangement being such that a bolt 175 (which may referred to in general terms as locking means) may be inserted through the hole 173 in one plate and the slot 171 of the other plate and then tightened to lock the two plates 165 and their respective end parts 163 in the desired position of angular adjustment. It will be observed, therefore, that this splice 161 design permits pivotal movement of two rail sections 5 relative to one another in a generally vertical plane. Each end part 163 of the splice 161 is provided with a fastener (e.g., a snap fastener 101 as shown in FIG. 8) for securing the end part 163 to the rail section 5 in which the end part is received.

It will be observed that the two end parts 163 of the horizontal pivot splice 161 and their respective plates 165 are formed as integral one-piece parts that are identical in construction. As a result, the splice 161 parts can be used interchangeably.

As best illustrated in FIG. 16, the narrow configuration of the supports 11 and the use of the horizontal 161 and vertical 151 pivot splices of this invention enables the rail sections 5 to weave ("snake") around, over and under structural elements 177 such as columns, ductwork and other members which might otherwise block installation. This makes the system 1 of the present invention not only adapted for use in new construction, but also especially adaptable for installation in existing buildings where structural members cannot readily be moved, and where large open areas permitting long straight runs are limited or non-existent.

FIG. 17 illustrates a second type of rail design in which a series of rungs 181 project laterally outwardly from a single rail 183 for carrying runs of data transmission lines and the like. The rail 183 is divided into a plurality of rail sections, each generally designated 185. In this design, each rail section 185 is rectangular in cross section and has a pair of opposing, generally parallel side walls 187, 189, first and second spaced-apart, generally parallel top and bottom connecting walls 191, 193 connecting the side walls 187, 189, and a horizontal partition 195 extending between the side walls 187, 189 dividing the interior of the rail section 5 into first 197 (upper) and second 199 (lower) interior spaces. The upper interior space 197 has a cross sectional shape and dimensions substantially identical to those of the upper interior space 21 defined by the upper box beam portion 13 of the first rail sections 5 previously described. This is important because it enables the splices of the same design to be used with both types of rail sections. That is, each of the splices previously described for use with rail sections 5 of the first 5 type can also be used with rail sections 185 of the second type shown in FIG. 17.

Each rail section 185 of the second type is provided with openings 201 adjacent its ends for receiving means to secure the end parts of the splices (e.g., end parts 75 of splice 7 as shown in FIG. 17) in place. As noted previously, this means may be a snap fastener 101 on the end part 75 of a splice 7 receivable in an opening 201 in the top wall 191 or partition 195 of the rail section 185, or a vertical bolt or support rod extending through a vertical bore defined in a sleeve 95 in the splice 7 and vertically aligned openings 201 in the top and bottom walls 191, 193 and partition 195 of the rail section 185. The openings 201 in the rail sections 185 may be factory or field drilled, as appropriate. To facilitate this drilling, the central longitudinal portions of the top and bottom walls 191, 193 of the rail section 185 are of reduced thickness (see FIG. 17). Moreover, grooves 203 are provided in the upper surface of the top wall 191 and the bottom surface of the bottom wall 193 along the central vertical plane of the rail section 185 to ensure proper lateral placement of the openings 201 and to provide an initial bite for a drill bit.

The rungs 181 of the system shown in FIG. 18 are tubular members of non-circular (e.g., rectangular) cross section which extend through openings (not shown) in the side walls 187, 189 of the rail sections 185 and through the lower interior space 199 of the rail section immediately below the partition 195. The shapes of the openings in the side walls 187, 189 of the rail sections 185 correspond to the cross sectional shapes of the rungs 181, and the runs are dimensioned to have a relatively snug fit between the partition 195 and the bottom wall 193 of the rail section 185 to provide added stability. Each rung 181 is suitably secured (as by a staking operation) to the rail section 185 to prevent lateral movement of the rung 181 relative to the rail section 185. The outer ends of the rungs 181 are bent upwardly to hold the lines being carried on the rungs.

The rail sections 185 may also be used in the manner shown in FIG. 19 in which each rail section is inverted so that wall 193 faces up and wall 191 faces down. The rungs 181 are installed to extend through the interior space 199, as in the previous design, and the bent outer ends of the rungs 181 extend upwardly.

FIG. 20 shows a rail section 185 mounted on a wall (e.g., wall 53) by means of a horizontal fastener 205. In this mounting arrangement, the rungs 181 extend laterally outwardly from the rail section 185 at only one side of the rail section. Otherwise the rung design is identical to that previously described.

FIG. 21 illustrates how a rail section 185 of the second configuration may be used with the trunk-and-arm supports of the type previously described. In this arrangement, the upper end 39 of the trunk 35 of each support 11 extends up through an opening (not shown) in the bottom wall 193 of the rail section 185 and abuts the partition 195. The trunk 35 is secured in place by a suitable fastener (e.g., fastener 45 shown in FIG. 3) extending through a side wall 187 or 189 of the rail section 185.

FIG. 22 illustrates another aspect of the system 1 of this invention comprising a circular hub 211 adapted to be supported in a horizontal position at a fixed elevation by means of a support rod 213, for example. As illustrated, a vertical sleeve 215 extends up from the center of the hub 211 for receiving the support rod 213 and providing the necessary stability. A plurality of rail connectors, each generally designated 217, are provided for connecting a series of rail sections (e.g., rail section 185) to the hub 211 in positions in which the rail sections radiate out from the hub. In FIG. 22, the rails sections 185 are illustrated as being of the second configuration described above, but it will be understood that rail sections 5 of the first (FIG. 1) configuration can also be used.

In accordance with this invention, each rail connector 217 is identical to one of the end parts 153 used in the vertical pivot splice 151 described above, having a first connector portion 219 comprising an end wall 221, two generally parallel side walls 223,225 extending from the end wall 221, and a sleeve 227 defining a vertical bore centrally supported between the side walls 223, 225 by a pair of webs 229. The side walls 223, 225 are spaced apart a distance only slightly less than the distance between the side walls 187, 189 of a rail section 185 being connected to the hub 211, and the overall height of the first connector portion 219 is only slightly less than that of the upper interior space 197 of the rail section 185 between its top wall 191 and the partition 195. The design is such that the first connector portion 219 is sized for a relatively snug fit inside the upper interior space 197 of the rail section 185. The first connector portion 219 is designed to be inserted into the rail section 185 to a position in which the bore defined by the vertical sleeve 215 is vertically aligned with suitable openings (not shown) in the top wall 191 and/or bottom wall 193 and/or partition 195 of the rail section 185 so that a suitable fastener, such as a snap fastener, bolt 101a or vertical support rod may inserted to secure the rail section 185 to the rail connector 217.

The rail connector 217 also includes a second connector portion 231 comprising a vertical sleeve 233 attached to the first connector portion 219. As shown in FIG. 22, the vertical sleeve 233 has a height which is about one-half the overall height of the rail connector 217. The first 219 and second 231 connector portions are preferably of one-piece construction.

The rail connectors 217 are releasably connected to the hub 211 by pin means comprising a plurality of pins 235 (e.g., a bolts) passing through the vertical sleeves 233 down through a series of holes 237 in the hub 211 spaced at intervals around the hub adjacent the periphery thereof. The number of holes 237 may vary as needed. In the embodiment of FIG. 22, the pivotal movement of the rail sections 185 about the vertical axes of the pins 235 is severely limited (and may be completely prevented, if desired) by the engagement of the lower part of a rail section 185 with the rim of the hub 211.

Figure 23:
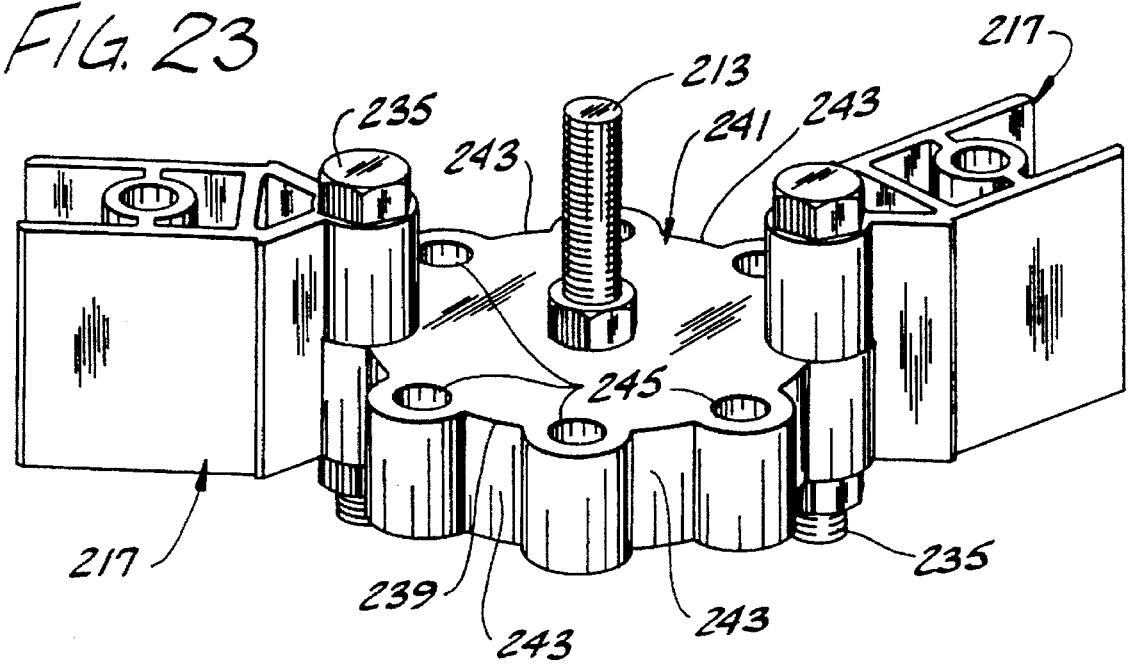
FIG. 23 is an enlarged perspective of an alternative hub design.

FIG. 23 shows an alternative hub design in which the rim 239 of the hub 241 is recessed as indicated at 243 between adjacent holes 245, and in which the rail connectors 217 are installed in a position inverted relative to the position shown in FIG. 22. This design permits the rail sections 185 to pivot freely (within a certain range) about the vertical axes of respective pins 235 to selected positions of angular adjustment. The range of pivotal movement is limited by the engagement of flats on the rail connector 217 with flats formed in the recessed areas 243 of the hub 241.

Referring to FIGS. 24–28, an elongate support structure of this invention is indicated in its entirety by the reference numeral 251. This structure 251 comprises a thin vertical wall 253 extending lengthwise of the structure generally centrally with respect thereto, and a plurality of tray members, each designated 255, extending laterally outwardly from the wall 253 at opposite sides of the wall at different elevations with respect to the wall. The tray members 255 and walls 253 combine to form a plurality of elongate horizontal trays extending lengthwise of the structure at different elevations for supporting in the trays a series of horizontal runs of date transmission lines and the like at the different elevations. A horizontal flange 257 runs the length of the structure 251 along the top of the wall 253. The tray structure 251 is preferably formed as a one-piece extrusion from metal or plastic, as needed.

Figure 25:
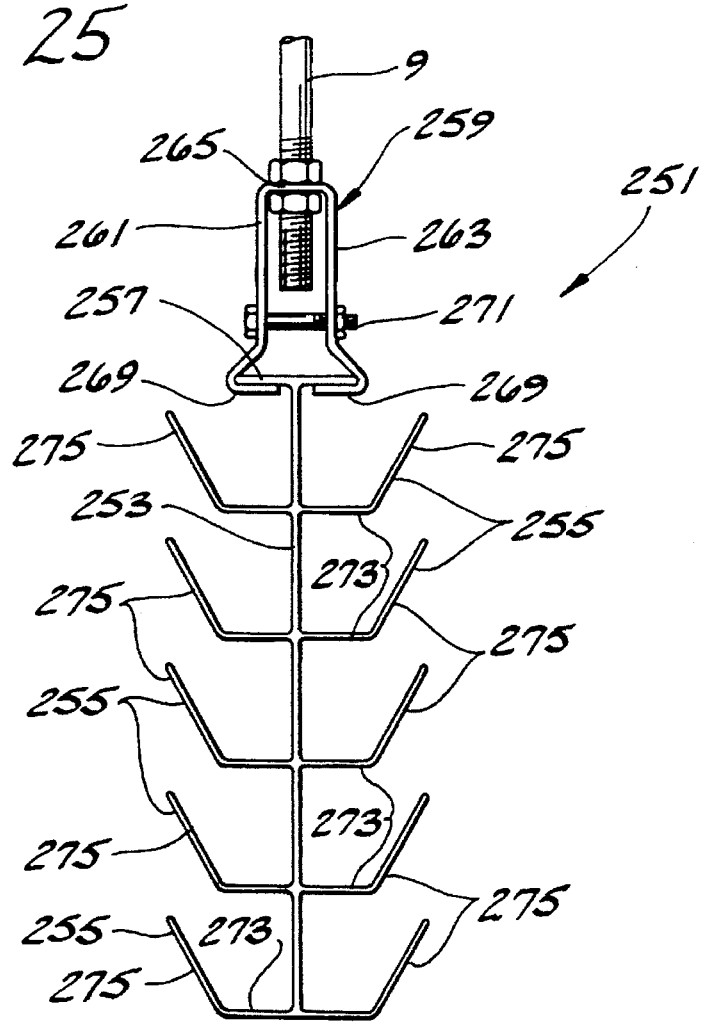
FIG. 25 is an end view of the support structure shown in FIG. 24.

The tray structure 251 is adapted to be supported in a horizontal position by hangers, each generally designated 259, engageable with the upper horizontal flange 257 of the structure. As shown in FIG. 25, the hanger 259 comprises a pair of legs 261, 263 connected at their upper ends by a connecting piece 265 having an opening (not shown) therein for receiving a vertical support rod (e.g., rod 9). The lower ends of the hanger legs 261, 263 are bent inwardly at 269 for engagement with the underside of the flange 257. A bolt 271 through the legs 261, 263 can be tightened to draw the legs together to secure the hanger 259 to the flange 257. Other hanger designs may also be suitable.

It will be understood that the number and location of tray members 255 may vary. The configuration of the tray members 255 may also vary from that shown in the drawing. For example, in FIG. 25 the tray members 255 are shown as having flat bottoms 273 and upwardly and outwardly inclined side walls 275, but it is also contemplated that the tray members 255 may have rounded configurations or vertical side walls.

Splices, each generally designated 277, are used to connect the a plurality of tray structures 251 end to end. As shown in FIG. 26, each splice 277 has a generally central part 279 and a pair of end parts, each indicated at 281, extending from the central part 279 for engagement with the wall 253 of the tray structures 251 to be connected. As viewed in horizontal cross section (FIG. 28), the central part 279 is a generally rectangular. The end parts 281 extend endwise from opposite sides 283, 285 of the central part 279, and each end part 281 has a vertical slot 287 therein extending inwardly from the outer end of the end part 281 into the central part 279 of the splice 277 for receiving an edge of the wall 253 of a respective tray structure 251. The width of each slot 287 is preferably slightly greater than the thickness of the wall 253 so that the wall is received in the slot 287 without flexing of the two walls 289,291 of the end part on opposite sides of the slot. The slots 287 in the two end parts 281 are generally coplanar, so that the walls 253 of the two tray structures 251 connected by the splice 277 are coplanar when they are received in the slots 287. The inner ends of the two vertical slots 287 should be as closely spaced to one another as possible while maintaining the necessary structural integrity and strength of the splice 277, so that the ends of two tray structures 251 connected by the splice are as close together as possible to provide a relatively smooth continuous tray surface.

A plurality of nut and bolt fasteners constitute means for securing the end parts 281 of the splice 277 to respective tray structures 251, the bolt 293 of each such fastener extending through a horizontal hole 295 in each end part 281, and through an aligned hole 297 in the wall 253 of the structure 251 where it is secured by the nut 299. Other types of screw fasteners may be used.

An appropriate number of splices 277 should be used to connect two tray structures 251. This number will vary depending on such factors as the overall height of the two structures.

The tray structure 251 of the type described is particularly useful in applications where containment and/or extra support of the lines being carried is important.

It will be observed from the foregoing that the system 1 of this invention has numerous advantages, many of which have already been discussed. One particular advantage which merits further mention, however, is that the support structures of this invention, particularly the structures shown in FIGS. 1 and 24, maximize the utilization of vertical corridor space while using relatively little horizontal corridor space, which is particularly important when installing support systems in existing building where horizontal corridor space may be severely limited. The minimum number of component parts needed for the system 1 provides for economical manufacture and facilitates installation. Placement of the lines on the system of this invention is also quickly and easily accomplished, and lines may be segregated at different elevations or on different supporting surfaces according to function, application or other selected criteria. Moreover, the various runs of cable, data transmission lines and the like are supported without exposure to rough or protruding edges, or to fasteners or other elements which might snag or damage the lines. The system of the present invention is highly flexible and can be utilized in virtually any application.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. A support system for data transmission lines, comprising a plurality of rail sections, a hub adapted to be supported at a fixed elevation and having a flat planar upper surface for supporting said data transmission lines;

a plurality of vertical holes in the hub at intervals spaced around the hub, connector means cooperable with said vertical holes in the hub for connecting the rail sections to the hub in positions in which the rail sections radiate out from the hub, and a series of rungs extending laterally out from the rail sections, said rungs having upper line supporting surfaces which are substantially coplanar with the upper surface of the hub.

2. A support system as set forth in claim 1 wherein said connector means comprises a plurality of rail connectors, each connector having a first connector portion adapted for connection to one end of a respective rail section, and a second connector portion adapted for connection to the hub.

3. A support system as set forth in claim 2 wherein said second connector portion has a vertical hole therethrough, said system further comprising a vertical member adapted to extend vertically through a vertical hole in the hub and said vertical hole in said second connector portion for connecting the connector to the hub.

4. A support system as set forth in claim 3 wherein said vertical member comprises vertical pin means.

5. A support system as set forth in claim 1 wherein each rail connector connects a respective rail section to the hub for pivotal movement of the rail section relative to the hub about a generally vertical axis.

6. A support system as set forth in claim 5 wherein each rail connector has a first connector portion adapted for connection to one end of a respective rail section, and a second connector portion adapted for connection to the hub.

7. A support system as set forth in claim 6 wherein said second connector portion comprises a vertical sleeve formed as an integral part of said first connector portion, and pin means comprising a vertical pin receivable in said vertical sleeve and through a vertical hole in the hub to permit pivotal movement of the connector and its respective rail section about a vertical axis of the pin.

8. A support system for data transmission lines comprising a plurality of rail sections, each rail section having a box beam portion with opposing side walls, a hub adapted to be supported at a fixed elevation and having an upper surface for supporting said data transmission lines, a plurality of vertical holes in the hub at intervals spaced around the hub, and a plurality of rail connectors cooperable with said vertical holes in the hub for connecting the rail sections to the hub in positions in which the rail sections radiate from the hub, each connector having a first connector portion adapted for connection to one end of a respective rail section, and a second connector portion adapted for connection to the hub, said first connector portion having opposite, generally parallel side walls spaced apart a distance only slightly less than the distance between opposing side walls of a rail section whereby the first connector portion is sized for a relatively snug fit inside the box beam portion of a respective rail section.

9. A support system as set forth in claim 8 further comprising vertical fastener means for connecting the first connector portion of said connector to said respective rail section.

10. A support system for data transmission lines, comprising a plurality of rail sections, each rail section having an upper rail portion, a lower rail portion, and a series of rungs extending laterally out from the lower portion of the rail section, said rungs having upper line supporting surfaces for supporting said data transmission lines, a hub adapted to be supported at a fixed elevation and having an upper surface for supporting said data transmission lines, a plurality of vertical holes in the hub at intervals spaced around the hub, and connector means cooperable with said vertical holes in the hub for connecting the rail sections to the hub in positions in which the rail sections radiate out from the hub, and in which said data transmission lines are supported by the rungs of the rail sections at an elevation generally the same as said upper surface of the hub.

11. A support system as set forth in claim 10 wherein each of said rungs has an upwardly bent outer end.

12. A support system as set forth in claim 10 wherein said hub is a relatively thin, flat horizontal member having a maximum thickness substantially less than the height of each of said rail sections.

13. A support system as set forth in claim 12 wherein said vertical holes include four holes arranged at about 90 degree intervals around the hub.

14. A support system as set forth in claim 13 wherein said vertical holes include holes spaced at intervals of less than 45 degrees with respect to the hub.

15. A support system for data transmission lines and the like, comprising a hub adapted to be supported at a fixed elevation in which an upper surface of the hub is in a generally horizontal plane, said hub being a relatively thin, flat member having a maximum thickness substantially less than the height of each of said rail sections, and having a continuous peripheral rim portion having four vertical holes arranged at about 90 degree intervals around the hub, a series of rail sections connected to the hub at intervals spaced around the hub, said rail sections radiating out from the hub, each rail section having an upper rail portion, a lower rail portion, and a series of rungs extending laterally out from the lower portion of the rail section, said rungs having upper line supporting surfaces for supporting said data transmission lines and the like at an elevation generally the same as the upper surface of the hub, and a series of connectors cooperable with said vertical holes for connecting the rail sections to the hub.

16. A support system as set forth in claim 15 wherein said vertical holes include holes spaced at intervals of less than 45 degrees with respect to the hub.

17. A support system for data transmission lines, comprising a thin flat hub adapted to be supported at a fixed elevation in which an upper surface of the hub is in a generally horizontal plane, said hub having a maximum thickness and a continuous peripheral rim portion having four vertical holes arranged at about 90 degree intervals around the hub, a plurality of rail sections, each rail section having a height as viewed from a side of the rail section substantially greater than the maximum thickness of said hub, and a series of rungs extending laterally out from the lower portion of the rail section for supporting said data transmission lines at an elevation generally the same as the upper surface of the hub, and a series of connectors cooperable with said vertical holes for connecting the rail sections to the hub.

18. A support system as set forth in claim 17 wherein said vertical holes include holes spaced at intervals of less than 45 degrees with respect to the hub.

* * * * *

UNITED STATES PATENT AND TRADEMARK OFFICE
CERTIFICATE OF CORRECTION

PATENT NO. : 5,628,481
DATED : May 13, 1997
INVENTOR(S) : Eric R. Rinderer

It is certified that error appears in the above-indentified patent and that said Letters Patent is hereby corrected as shown below:

Column 1, line 23, "Mother" should read ---Another---.

Column 3, lines 47-48, "comprising 5 a rail" should read ---comprising a rail---.

Column 10, line 55, "first 5 type" should read ---first type---.

Signed and Sealed this

Seventeenth Day of February, 1998

Attest:

BRUCE LEHMAN

*Attesting Officer*  *Commissioner of Patents and Trademarks*